US012696878B2

(12) United States Patent
Khare et al.

(10) Patent No.: US 12,696,878 B2
(45) Date of Patent: Aug. 4, 2026

(54) ANIMAL DATA COMPLIANCE SYSTEM AND METHOD

(71) Applicant: SPORTS DATA LABS, INC., Royal Oak, MI (US)

(72) Inventors: Vivek Khare, Cupertino, CA (US); Mark Gorski, Royal Oak, MI (US); Stan Mimoto, Bethel Island, CA (US)

(73) Assignee: Sports Data Labs, Inc., Royal Oak, MI (US)

( * ) Notice: Subject to any disclaimer, the term of this patent is extended or adjusted under 35 U.S.C. 154(b) by 0 days.

(21) Appl. No.: 18/038,022

(22) PCT Filed: Jan. 6, 2022

(86) PCT No.: PCT/US2022/011452
§ 371 (c)(1),
(2) Date: May 21, 2023

(87) PCT Pub. No.: WO2022/150486
PCT Pub. Date: Jul. 14, 2022

(65) Prior Publication Data
US 2023/0404038 A1 Dec. 21, 2023

Related U.S. Application Data

(60) Provisional application No. 63/213,526, filed on Jun. 22, 2021, provisional application No. 63/134,332, filed on Jan. 6, 2021.

(51) Int. Cl.
*A01K 29/00* (2006.01)
*G06N 5/025* (2023.01)

(52) U.S. Cl.
CPC ........... *A01K 29/005* (2013.01); *G06N 5/025* (2013.01)

(58) Field of Classification Search
CPC ........ A01K 29/005; G06N 5/025; G06N 5/04; G06F 21/6218; G06F 21/31; G06Q 10/06; A61B 5/00
See application file for complete search history.

(56) References Cited

U.S. PATENT DOCUMENTS

| | | |
|---|---|---|
| 10,980,218 B2 | 4/2021 | Gorski et al. |
| 2005/0108200 A1 | 5/2005 | Meik et al. |

(Continued)

FOREIGN PATENT DOCUMENTS

| | | |
|---|---|---|
| KR | 20040013097 A | 2/2004 |
| WO | 2019/210075 A1 | 10/2019 |

OTHER PUBLICATIONS

International Search Report and Written Opinion dated Apr. 8, 2022 for PCT Appn. No. PCT/US2022/011452, 21 pgs.

(Continued)

*Primary Examiner* — Rufus C Point
(74) *Attorney, Agent, or Firm* — Brooks Kushman P.C.

(57) ABSTRACT

An animal data compliance system includes one or more sources of animal data from one or more targeted individuals wherein the animal data is transmitted electronically. A collecting computing device gathers the animal data. One or more rules related to at least a portion of the animal data are created or modified based upon one or more terms. The one or more rules are associated with at least a portion of the animal data. At least a portion of animal data and the one or more rules are provided to one or more receiving computing devices. The one or more rules informs the one or more receiving computing devices of one or more permissions or restrictions related to the animal data. The one or more receiving computing devices take at least one action based upon the one or more rules.

45 Claims, 5 Drawing Sheets

(56)        References Cited

U.S. PATENT DOCUMENTS

| | | | |
|---|---|---|---|
| 2008/0008357 A1* | 1/2008 | Barreto Martins | A01K 29/00 |
| | | | 382/110 |
| 2008/0147422 A1* | 6/2008 | Van Buskirk | G06Q 10/0631 |
| | | | 705/7.12 |
| 2009/0326982 A1* | 12/2009 | Deobhakta | G16H 10/60 |
| | | | 705/3 |
| 2010/0153146 A1 | 6/2010 | Angell et al. | |
| 2012/0260346 A1* | 10/2012 | Carey | G06F 21/10 |
| | | | 726/26 |
| 2014/0222522 A1 | 8/2014 | Chait | |
| 2016/0034809 A1 | 2/2016 | Trenholm et al. | |
| 2016/0259492 A1* | 9/2016 | Le | G06F 3/015 |
| 2017/0308715 A1 | 10/2017 | Drost-Hansen et al. | |
| 2018/0211718 A1 | 7/2018 | Heath | |
| 2019/0205558 A1 | 7/2019 | Gonzales, Jr. | |
| 2019/0272537 A1* | 9/2019 | Miller | H04L 63/0428 |
| 2020/0044830 A1* | 2/2020 | Gargett | G06F 21/6218 |
| 2020/0320207 A1 | 10/2020 | Beno et al. | |
| 2023/0033102 A1 | 2/2023 | Gorski et al. | |
| 2023/0131370 A1 | 4/2023 | Gorski et al. | |

OTHER PUBLICATIONS

Search Report dated Oct. 15, 2024 for European Appn. No. 22737108.
5, 11 pgs.
Non-Final Office Action dated Dec. 3, 2024 for U.S. Appl. No.
18/231,345, 25 pgs.
Final Office Action dated Jun. 24, 2025 for U.S. Appl. No. 18/231,345,
36 pgs.
Non-Final Office Action dated Feb. 24, 2026 for U.S. Appl. No.
18/231,345, 34 pgs.

* cited by examiner

ANIMAL DATA COMPLIANCE SYSTEM AND METHOD

CROSS-REFERENCE TO RELATED APPLICATIONS

This application is the U.S. national phase of PCT Appln. No. PCT/US2022/011452 filed Jan. 6, 2022, which claims the benefit of U.S. provisional application Ser. No. 63/213, 526 filed Jun. 22, 2021 and U.S. provisional application Ser. No. 63/134,332 filed Jan. 6, 2021, the disclosures of which are hereby incorporated in their entirety by reference herein.

TECHNICAL FIELD

In at least one aspect, the present invention is related to systems and methods for tracking and monitoring the use of animal data, as well as associating rules to the animal data that provide permissions and restrictions related to its distribution and use.

BACKGROUND

The continuing advances in the availability of information over the Internet have substantially changed the way that business is conducted. Simultaneous with this information, the way animal data is distributed and shared has also progressed. In many cases, animal data is shared and used via computing devices while governed by agreements which derive from the preferences of the animal data rights holder (e.g., data owner). However, no mechanism exists to associate rules with the animal data based upon the preferences established by the rights-holder in order to inform computing devices receiving the animal data about approved uses of the animal data and prevent unauthorized uses of the animal data by data acquirers.

Accordingly, there is a need for a system and method that associates rules with acquired animal data based upon the preferences established by the rights holder to restrict or enable the use of the animal data, as well as inform computing devices receiving the animal data of approved uses or restrictions to ensure compliance related to its use.

SUMMARY

In at least one aspect, an animal data compliance system is described. The animal data compliance system includes one or more sources of animal data from one or more targeted individuals wherein the animal data is transmitted electronically. A collecting computing device gathers (i.e., receives or collects) the animal data. One or more rules related to at least a portion of the animal data are created or modified based upon one or more terms. The one or more rules are associated with at least a portion of the animal data. At least a portion of animal data and the one or more rules are provided to one or more receiving computing devices. The one or more rules inform (e.g., notifies) the one or more receiving computing devices of one or more permissions or restrictions related to the animal data (e.g., related to the distribution or use of the animal data). The one or more receiving computing devices take at least one action based upon the one or more rules.

In another aspect, an animal data compliance system method implemented by the systems described herein is provided. The method includes steps of electronically transmitting animal data from one or more sources of animal data from one or more targeted individuals as transmitted animal data; and receiving the transmitted animal data with a collecting computing device. The method also includes a step of creating or modifying one or more rules related to at least a portion of the animal data based upon one or more terms. The one or more rules are associated with the animal data. At least a portion of the animal data and the one or more rules are provided to one or more receiving computing devices. Characteristically, the one or more rules inform the one or more receiving computing devices of one or more permissions or restrictions related to the animal data. Advantageously, the one or more receiving computing devices take at least one action based upon the one or more rules.

In another aspect, an animal data compliance method is described. The method includes a step of electronically transmitting one or more sources of animal data from one or more targeted individuals. Animal data is gathered (i.e., received or collected) by a collecting computing device. One or more rules related to at least a portion of the animal data are created or modified based upon one or more terms, the one or more terms at least partially sourced from information gathered from one or more digital records associated either directly or indirectly with the animal data, animal data rights holder (e.g., animal data owner), one or more animal data acquirers, or a combination thereof. The one or more rules are associated with the at least a portion of animal data. The at least a portion of animal data and the one or more rules are provided to one or more receiving computing devices. The one or more rules inform the one or more receiving computing devices of one or more permissions or restrictions related to the animal data. The one or more rules instruct the one or more receiving computing devices to take at least one action. The one or more terms, the one or more rules provided to the one or more receiving computing devices, or combinations thereof are included as part of the one or more digital records (e.g., added to, or modify, the one or more digital records).

In another aspect, an animal data compliance method implemented by the systems described herein is provided. The method includes steps of electronically transmitting animal data from one or more sources of animal data from one or more targeted individuals as transmitted animal data and receiving the transmitted animal data with a collecting computing device. The method also includes a step of creating or modifying one or more rules related to at least a portion of the animal data based upon one or more terms. The method also includes a step of creating or modifying one or more lines of executable code based upon the one or more rules embedded within the at least a portion of the animal data. At least a portion of the animal data and the one or more lines of executable code are provided to one or receiving more computing devices. Advantageously, the one or more lines of executable code instruct the one or more receiving computing devices to take one or more actions.

In another aspect, an animal data compliance system is described. The animal data compliance system includes one or more source sensors that gather (i.e., receives or collects) animal data from one or more targeted individuals, wherein the animal data is transmitted electronically. A collecting computing device gathers the animal data, wherein one or more terms related to the distribution or use of the animal data (e.g., terms that enable, prevent, or determine one or more uses or actions related to the animal data) are defined by the one or more users, one or more animal data acquirers, one or more computing programs, or a combination thereof, via one or more computing devices (e.g., the collecting computing device, one or more other computing devices). One or more digital records associated either directly or indirectly with the animal data, animal data rights holder, animal data acquirer, or a combination thereof, are created or modified based upon the one or more terms. One or more rules related to the animal data are created or modified based upon, at least in part, information gathered from the one or more terms and the one or more digital records, wherein the one or more rules are associated with the animal data. At least a portion of the animal data and the associated one or more rules are distributed by the one or more computing devices to one or more receiving computing devices, wherein the same portion of animal data and the associated rules are distributed at least one of: (1) over multiple periods of time, (2) across multiple transactions, (3) to multiple parties, (4) to multiple computing devices, or (5) a combination thereof. The one or more terms associated with the one or more distributions or uses, the one or more rules provided, or a combination thereof are included as part of the one or more digital records.

In still another aspect, an animal data compliance method implemented by the animal data compliance systems described herein is provided. The method includes steps of electronically transmitting one or more sources of animal data from one or more targeted individuals and gathering (i.e., receiving or collecting) the animal data by a collecting computing device. The method further includes steps of creating or modifying one or more rules related to at least a portion of the animal data based upon one or more terms and associating the one or more rules with the animal data. At least a portion of the animal data and the one or more rules is provided to one or more receiving computing devices. The one or more rules informs the one or more receiving computing devices of one or more permissions or restrictions related to the animal data via the one or more rules. At least one action based upon the one or more rules is performed by the one or more receiving computing devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
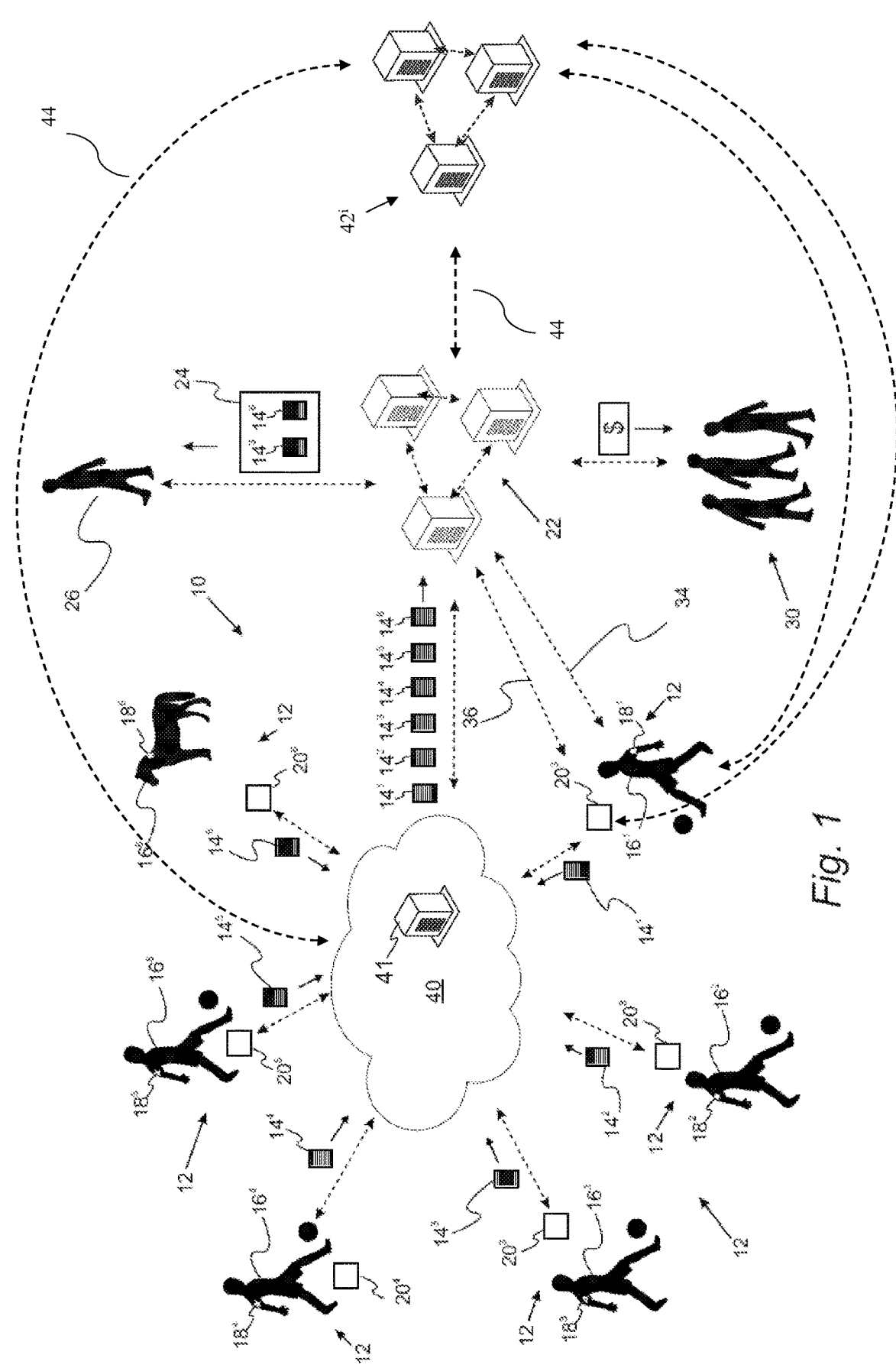
FIG. 1 provides a general schematic illustration of an animal data compliance system that enables compliance related to the collection, use, and distribution of animal data.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The phrase "data is" is meant to include both "datum is" and "data are," as well as all other possible meanings, and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

Throughout this application, where publications are referenced, the disclosures of these publications in their entireties are hereby incorporated by reference into this application to more fully describe the state of the art to which this invention pertains.

The term "computing device" refers generally to any device that can perform at least one function, including communicating with another computing device. In a refinement, a computing device includes a central processing unit that can execute program steps and memory for storing data and a program code.

When a computing device is described as performing an action or method step, it is understood that the one or more computing devices are operable to perform the action or method step typically by executing one or more lines of source code. The actions or method steps can be encoded onto non-transitory memory (e.g., hard drives, optical drive, flash drives, and the like).

The term "server" refers to any computer or computing device (including, but not limited to, desktop computer, notebook computer, laptop computer, mainframe, mobile phone, smart watch, head-mountable units such as smart glasses, smart contact lens, augmented reality headsets, virtual reality headsets, mixed reality headsets, hearables, augmented reality devices, virtual reality devices, mixed reality devices, and the like), distributed system, blade, gateway, switch, processing device, or a combination thereof adapted to perform the methods and functions set forth herein.

It should also be appreciated that any method step described herein can be performed by a computing device or computing device. Although collecting computing devices, receiving computing devices, and generating computing devices are described, the method steps can be performed by any computing device or system having the design of FIG. 5.

The term "electronic communication" means that an electrical signal is either directly or indirectly sent from an originating electronic device to a receiving electronic device. Indirect electronic communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electronic communication can be accomplished with wired components, wirelessly-connected components, or a combination thereof.

The processes, methods, or algorithms disclosed herein can be deliverable to or implemented by a computer, controller, or other computing device, which can include any existing programmable electronic control unit or dedicated electronic control unit. Similarly, the processes, methods, or algorithms can be stored as data and instructions executable by a computer, controller, or other computing device in many forms including, but not limited to, information permanently stored on non-writable storage media such as ROM devices and information alterably stored on writeable storage media such as floppy disks, magnetic tapes, CDs, RAM devices, other magnetic and optical media, and shared or dedicated cloud computing resources. The processes, methods, or algorithms can also be implemented in an executable software object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

The terms "subject" and "individual" are synonymous and used interchangeably. Both terms. refer to a human or other animal, including birds, reptiles, amphibians, and fish, as well as all mammals including, but not limited to, primates (particularly higher primates), horses, sheep, dogs, rodents, pigs, cats, rabbits, and cows. The one or more subjects or individuals may be, for example, humans participating in athletic training or competition, horses racing on a race track, humans playing a video game, humans monitoring their personal health, humans providing their animal data to a third party (e.g., insurance system, health system), humans participating in a research or clinical study, or humans participating in a fitness class. A subject or individual can also be a derivative of a human or other animal (e.g., lab-generated organism derived at least in part from a human or other animal), one or more individual components, elements, or processes of a human or other animal (e.g., cells, proteins, biological fluids, amino acid sequences, tissues, hairs, limbs) that make up the human or other animal, one or more digital representations that share at least one characteristic with a human or other animal (e.g., data set representing a human that shares at least one characteristic with a human representation in digital form—such as sex, age, biological function as examples—but is not generated from any human that exists in the physical world; a simulated individual or digital individual that is based on, at least in part, a real-world human or other animal, such as a digital representation of an individual in a virtual environment or simulation such as a video game or metaverse), or one or more artificial creations that share one or more characteristics with a human or other animal (e.g., lab-grown human brain cells that produce an electrical signal similar to that of human brain cells). In a refinement, the subject or individual can be one or more programmable computing devices such as a machine (e.g., robot, autonomous vehicle, mechanical arm) or network of machines that share at least one biological function with a human or other animal and from which one or more types of biological data can be derived, which may be, at least in part, artificial in nature (e.g., data from artificial intelligence-derived activity that mimics biological brain activity; biomechanical movement data derived a programmable machine).

The term "user" refers to any animal data creator (e.g., the targeted individual from whom the animal data is derived from), animal data rights holder (e.g., the animal data owner, which may be different than the animal data creator in some cases; a licensor or licensee with one or more rights to the animal data), authorized animal data manager or representative (e.g., lawyer, agent, entity), authorized administrator of animal data, or a similar subject or entity that has one or more rights to create or modify one or more terms related to the acquisition, distribution, and/or use of the animal data, either because of their own vested interest or on behalf of another one or more individuals or entities with a vested interest. For example, a user can be the subject from which the animal data is derived, an entity that manages animal data on behalf of a subject or multiple subjects, a medical professional that takes one or more actions on behalf of the animal data rights-holder (e.g., patient), a subject or group of subjects with a license to the animal data, an entity or multiple entities with a license to the animal data, and the like. In a refinement, a user may be one or more computer programs that manage animal data and/or take one or more actions related to the animal data on behalf of one or more animal data rights holders, authorized animal data managers or representatives, authorized administrators of animal data, or the like. In another refinement, the term "user" can mean either a single user (e.g., a single subject managing their own animal data; a single entity managing multiple subjects and their associated animal data) or multiple users (e.g., multiple subjects managing their own animal data; multiple entities managing a single subject and their animal data; multiple entities managing multiple subjects and their associated animal data). In another refinement, multiple users may be associated with the same animal data, the same animal data rights holder, or both (e.g., an animal data creator/owner and their authorized animal data manager may both be associated with the same animal data and have access to create or modify one or more terms related to the same animal data). In another refinement, the term "user" can include both a single user and multiple users. The type of user can be determined from context.

The term "animal data" refers to any data obtainable from, or generated directly or indirectly by, a subject that can be transformed into a form that can be transmitted to a server or other computing device. Typically, animal data is electronically transmitted with a wired or wireless connection. Animal data includes, but is not limited to, any subject-derived data, including any signals or readings, that can be obtained from one or more sensors or sensing equipment/ systems, and in particular, biological sensors (biosensors), as well as its one or more derivatives. Animal data also includes descriptive data related to a subject (e.g., name, age, height, anatomical information), auditory data related to a subject, visually-captured data related to a subject (e.g., image, likeness, observable information related to the subject), neurologically-generated data (e.g., brain signals from neurons), evaluative data related to a subject (e.g., skills of a subject), data that can be manually entered or gathered related to a subject (e.g., medical history, social habits, feelings of a subject, mental health data, financial information), and the like. In a refinement, the term "animal data" is inclusive of any derivative of animal data, including one or more computed assets, insights, predictive indicators, or artificially-generated data (e.g., simulated animal data in a virtual environment, video game, or other simulation) that is based upon at least a portion of real-world animal data. In another refinement, animal data includes one or more inputs (e.g., signals, readings, other data) from one or more non-animal data sources. In another refinement, animal data includes at least a portion of non-animal data that provides contextual information related to the animal data. In another refinement, animal data includes any metadata gathered or associated with the animal data (e.g., which can include one or more terms created or modified by a user related to the acquisition, distribution, and/or use of the animal data). In another refinement, animal data includes at least a portion of simulated data. In another refinement, animal data is inclusive of simulated data. In another refinement, animal data is inclusive historical animal data. In yet another refinement, one or more sources of animal data include one or more sensors. In a refinement, raw animal data (i.e., as received from the sensors) can be converted and/or stored in any convenient format such as text files, XML, and the like.

The term "artificial data" refers to artificially-created data that is derived from, based on, or generated using, at least in part, animal data or one or more derivatives thereof. It can be created by running one or more simulations utilizing one or more artificial intelligence techniques or statistical models and can include one or more inputs (e.g., signals, readings, other data) from one or more non-animal data sources. In a refinement, artificial data includes any artificially-created data that shares at least one biological function with a human or another animal (e.g., artificially-created vision data, artificially-created movement data). Artificial data is inclusive of "synthetic data," which can be any production data applicable to a given situation that is not obtained by direct measurement. Synthetic data can be created by statistically modeling original data and then using the one or more models to generate new data values that reproduce at least one of the original data's statistical properties. In another refinement, the term "artificial data" is inclusive of any derivative of artificial data. For the purposes of the presently disclosed and claimed subject matter, the terms "simulated data" and "synthetic data" are synonymous and used interchangeably with "artificial data," and a reference to any one of the terms should not be interpreted as limiting but rather as encompassing all possible meanings of all the terms. In another refinement, the term "artificial data" is inclusive of the term "artificial animal data."

The term "insight" refers to one or more descriptions that can be assigned to a targeted individual that describe a condition or status of or related to the targeted individual utilizing at least a portion of their animal data. Examples include descriptions or other characterizations related to an individual's stress levels (e.g., high stress, low stress), energy or fatigue levels, bodily responses, medical conditions, and the like. An insight may be quantified by one or more numbers or a plurality of numbers and may be represented as a probability or similar odds-based indicator. An insight may also be quantified, communicated, or characterized by one or other metrics or indices of performance that are predetermined (e.g., codes, graphs, charts, plots, colors or other visual representations, plots, readings, numerical representations, descriptions, text, physical responses such as a vibration, auditory responses, visual responses, kinesthetic responses, or verbal descriptions). An insight may also include one or more visual representations related to a condition or status of one or more targeted subjects (e.g., an avatar or virtual depiction of a targeted subject visualizing future weight loss goals on the avatar or depiction of the targeted subject). In a refinement, an insight is a personal score or other indicator related to one or more targeted individuals or groups of targeted individuals that utilizes at least a portion of animal data to (1) evaluate, assess, prevent, or mitigate animal data-based risk, (2) to evaluate, assess, or optimize animal data-based performance (e.g., biological performance), or a combination thereof. The personal score or other indicator can be utilized by the one or more targeted subjects from which the animal data or one or more derivatives thereof are derived from, as well as one or more third parties (e.g., insurance organizations, health-care providers or professionals, sports performance coaches, medical billing organizations, fitness trainers, employers, virtual environment operators, and the like). In another refinement, an insight is derived from two or more types of animal data. In another refinement, an insight is derived from one or more computed assets. In another refinement, an insight is derived from one or more predictive indicators. In another refinement, an insight is derived related to a targeted subject or group of targeted subjects using at least a portion of animal data not derived from the targeted subject or group of targeted subjects. In another refinement, an insight includes one or more inputs (e.g., signals, readings, other data) from one or more non-animal data sources in one or more computations, calculations, derivations, incorporations, simulations, extractions, extrapolations, modifications, enhancements, creations, estimations, deductions, inferences, determinations, processes, communications, and the like. In another refinement, an insight includes a plurality of insights. In another refinement, an insight is assigned to multiple targeted individuals. In yet another refinement, an insight is assigned to one or more groups of targeted individuals.

The term "computed asset" refers to one or more numbers, a plurality of numbers, values, metrics, readings, insights, graphs, charts, or plots that are derived from at least a portion of the animal data or one or more derivatives thereof (which can be inclusive of simulated data). For example, in the context of sensor-derived animal data, the one or more sensors used herein initially provide an electronic signal. The computed asset is extracted or derived, at least in part, from the one or more electronic signals or one or more derivatives thereof. The computed asset can describe or quantify an interpretable property of the one or more targeted individuals or groups of targeted individuals. For example, electrocardiogram readings can be derived from analog front end signals (e.g., the electronic signal from the sensor), heart rate data (e.g., heart rate beats per minute) can be derived from an electrocardiogram or PPG sensors, body temperature data can be derived from temperature sensors, perspiration data can be derived or extracted from perspiration sensors, glucose information can be derived from biological fluid sensors, DNA and RNA sequencing information can be derived from sensors that obtain genomic and genetic data, brain activity data can be derived from neurological sensors, hydration data can be derived from in-mouth saliva or sweat analysis sensors, location data can be derived from GPS or RFID-based sensors, biomechanical data can be derived from optical or translation sensors, and breathing rate data can be derived from respiration sensors. In a refinement, a computed asset includes one or more inputs (e.g., signals, readings, other data) from one or more non-animal data sources in one or more computations, calculations, derivations, incorporations, simulations, extractions, extrapolations, modifications, enhancements, creations, estimations, deductions, inferences, determinations, processes, communications, and the like. In another refinement, a computed asset is derived from two or more types of animal data. In another refinement, a computed asset can include a plurality of computed assets.

The term "predictive indicator" refers to a metric or other indicators (e.g., one or more colors, codes, numbers, values, graphs, charts, plots, readings, numerical representations, descriptions, text, physical responses, auditory responses, visual responses, kinesthetic responses) derived from at least a portion of animal data from which one or more forecasts, predictions, probabilities, assessments, possibilities, projections, or recommendations related to one or more outcomes for one or more future events that include one or more targeted individuals, or one or more groups of targeted individuals, can be calculated, computed, derived, extracted, extrapolated, quantified, simulated, created, modified, assigned, enhanced, estimated, evaluated, inferred, established, determined, converted, deduced, observed, communicated, or actioned upon. In a refinement, a predictive indicator includes one or more inputs (e.g., signals, readings, other data) from one or more non-animal data sources as one or more inputs in the one or more calculations, computations, derivations, extractions, extrapolations, simulations, creations, modifications, assignments, enhancements, estimations, evaluations, inferences, establishments, determinations, conversions, deductions, observations, or communications of its one or more forecasts, predictions, probabilities, possibilities, assessments, projections, or recommendations. In another refinement, a predictive indicator includes at least a portion of simulated data as one or more inputs in the one or more calculations, computations, derivations, extractions, extrapolations, simulations, creations, modifications, assignments, enhancements, estimations, evaluations, inferences, establishments, determinations, conversions, deductions, observations, or communications of its one or more forecasts, predictions, probabilities, possibilities, assessments, projections, or recommendations. In another refinement, a predictive indicator is derived from two or more types of animal data. In yet another refinement, a predictive indicator includes of a plurality of predictive indicators.

When an item number has a letter superscript or subscript (e.g., $14^k$), the letter is an integer label that runs from 1 up to a maximum value that can be referred to as the item number with "max" as a subscript or superscript (e.g., $k_{max}$).

With reference to FIG. 1, a schematic for an animal data compliance system is provided. Animal data compliance system 10 includes one or more sources 12 of animal data $14^k$ that can be transmitted electronically. Label k is merely an integer label from 1 to $k_{max}$ associated with each instance of the animal data where $k_{max}$ is the total number of instances of animal data. In this context, transmitted electronically includes being provided in an electronic form (e.g., digital form). In some variations, source 12 of animal data $14^k$ refers to data related to targeted individual $16^i$. Targeted individual $16^i$ is the subject from which corresponding animal data $14^k$ is collected. Label i is merely an integer label from 1 to $i_{max}$ associated with each targeted individual, where $i_{max}$ is the total number of targeted individuals, which can be 1 to several thousand or more. In this context, animal data can refer to any data related to a subject. In some variations, animal data refers to data related to a subject's body derived, at least in part, from one or more sensors and, in particular, biological sensors (also referred to as biosensors). Therefore, the one or more sources 12 of animal data includes one or more sensors. In many useful applications, targeted individual $16^i$ is a human (e.g., an athlete, a soldier, a healthcare patient, a research subject, a participant in a fitness class, a video gamer), and the animal data $14^k$ is human data.

Animal data can be derived from a targeted individual or multiple targeted individuals (e.g., including a targeted group of multiple targeted individuals, multiple targeted groups of multiple targeted individuals). In the case of sensors that collect data from one or more targeted individuals, the animal data can be obtained from a single sensor gathering information from each targeted individual or from multiple sensors gathering information from each targeted individual. In some cases, a single sensor can capture data from multiple targeted individuals, a targeted group of multiple targeted individuals, or multiple targeted groups of multiple targeted individuals (e.g., an optical-based camera sensor that can locate and measure distance run for a targeted group of targeted individuals, biomechanical movements, visual images of the targeted individuals, and the like). Each sensor can provide a single type of animal data or multiple types of animal data. In a variation, sensor $18^l$ can include multiple sensing elements to measure one or more parameters within a single sensor (e.g., heart rate and accelerometer data) where l is a label for the sensor which runs from 1 to the total number of sensors. One or more sensors $18^l$ can collect data from a targeted individual engaged in a variety of activities, including strenuous activities that can change one or more biological signals or readings in a targeted individual, such as blood pressure, heart rate, or biological fluid levels. Activities may also include sedentary activities such as sleeping or sitting, where changes in biological signals or readings may have less variance. In a refinement, one or more sensors $18^l$ can be classified as a computing device with one or more computing capabilities. In a variation, animal data compliance system 10 can also gather (e.g., receive, collect) animal data not obtained from sensors (e.g., animal data that is inputted or gathered via a computing device; animal data sets that include artificial data values not generated directly from a sensor; animal data received from another computing device). In a refinement, one or more sensors $18^l$ are operable to collect at least a portion of non-animal data.

One or more sensors $18^l$ can include one or more biological sensors (also referred to as biosensors). Biosensors collect biosignals, which in the context of the present embodiment are any signals or properties in, or derived from, animals that can be continually or intermittently measured, monitored, observed, calculated, computed, or interpreted, including both electrical and non-electrical signals, measurements, and artificially-generated information. A biosensor can gather biological data (including readings and signals) such as physiological data, biometric data, chemical data, biomechanical data, genetic data, genomic data, glycomic data, location data, or other biological data from one or more targeted individuals. For example, some biosensors may measure, or provide information that can be converted into or derived from, biological data such as eye tracking data and recognition data (e.g., pupillary response, movement, pupil diameter, iris recognition, retina scan, eye vein recognition, EOG-related data), blood flow data and/or blood volume data (e.g., PPG data, pulse transit time, pulse arrival time), biological fluid data (e.g., analysis derived from blood, urine, saliva, sweat, cerebrospinal fluid), body composition data (e.g., bioelectrical impedance analysis, weight-based data including weight, body mass index, body fat data, bone mass data, protein data, basal metabolic rate, fat-free body weight, subcutaneous fat data, visceral fat data, body water data, metabolic age, skeletal muscle data, muscle mass data), pulse data, oxygenation data (e.g., SpO2), core body temperature data, galvanic skin response data, skin temperature data, perspiration data (e.g., rate, composition), blood pressure data (e.g., systolic, diastolic, MAP), glucose data (e.g., fluid balance I/O, glycogen usage), hydration data (e.g., fluid balance I/O), heart-based data (e.g., heart rate, average HR, HR range, heart rate variability, HRV time domain, HRV frequency domain, autonomic tone, ECG-related data including PR, QRS, QT, RR intervals, echocardiogram data, thoracic electrical bioimpedance data, transthoracic electrical bioimpedance data), neurological data and other neurological-related data (e.g., EEG-related data), genetic-related data, genomic-related data, skeletal data, muscle data (e.g., EMG-related data including surface EMG, amplitude, adenosine triphosphate (ATP) data, muscle fiber types, muscle contraction velocity, muscle elasticity, soft-tissue strength), respiratory data (e.g., respiratory rate, respiratory pattern, inspiration/expiration ratio, tidal volume, spirometry data), and the like. Some biosensors may detect biological data such as biomechanical data which may include, for example, angular velocity, joint paths, kinetic or kinematic loads, gait description, step count, or position or accelerations in various directions from which a subject's movements may be characterized. Some biosensors may gather biological data such as location and positional data (e.g., GPS, ultra-wideband RFID-based data; posture data), facial recognition data, audio data, kinesthetic data (e.g., physical pressure captured from a sensor located at the bottom of a shoe), other biometric authentication data (e.g., fingerprint data, hand geometry data, voice recognition data, keystroke dynamics data, signature recognition data, ear acoustic authentication data, eye vein recognition data, finger vein recognition data, footprint and foot dynamics data, body odor recognition data, palm print recognition data, palm vein recognition data, skin reflection data, thermography recognition data, speaker recognition data, voice recognition data, gait recognition data, lip motion data), or auditory data (e.g., speech/voice data, sounds made by the subject) related to the one or more targeted individuals. Some biological sensors may be image or video-based and collect, provide and/or analyze video or other visual data (e.g., still or moving images, including video, MRIs, computed tomography scans, ultrasounds, echocardiograms, X-rays) upon which biological data can be detected, measured, monitored, observed, extrapolated, calculated, or computed (e.g., biomechanical movements or location-based information derived from video data, a fracture detected based on an X-Ray, or stress or a disease of a subject observed based on a video or image-based visual analysis of a subject). Some biosensors may derive information from biological fluids such as blood (e.g., venous, capillary), saliva, urine, sweat, and the like, including (but not limited to) triglyceride levels, red blood cell count, white blood cell count, adrenocorticotropic hormone levels, hematocrit levels, platelet count, ABO/Rh blood typing, blood urea nitrogen levels, calcium levels, carbon dioxide levels, chloride levels, creatinine levels, glucose levels, hemoglobin A1c levels, lactate levels, sodium levels, potassium levels, bilirubin levels, alkaline phosphatase (ALP) levels, alanine transaminase (ALT) levels, and aspartate aminotransferase (AST) levels, albumin levels, total protein levels, prostate-specific antigen (PSA) levels, microalbuminuria levels, immunoglobulin A levels, folate levels, cortisol levels, amylase levels, lipase levels, gastrin levels, bicarbonate levels, iron levels, magnesium levels, uric acid levels, folic acid levels, vitamin B-12 levels, and the like. In a variation, some biosensors may collect biochemical data, including acetylcholine data, dopamine data, norepinephrine data, serotonin data, GABA data, glutamate data, hormonal data, and the like. In addition to biological data related to one or more targeted individuals, some biosensors may measure non-biological data (e.g., ambient temperature data, humidity data, elevation data, and barometric pressure data, and the like). In a refinement, one or more sensors provide biological data that include one or more calculations, computations, predictions, probabilities, possibilities, estimations, evaluations, inferences, determinations, deductions, observations, or forecasts that are derived, at least in part, from animal data. In another refinement, the one or more biosensors are capable of providing at least a portion of artificial data. In another refinement, the one or more biosensors are capable of providing two or more types of data, at least one of which is biological data (e.g., heart rate data and VO2 data, muscle activity data and accelerometer data, VO2 data, and elevation data). Advantageously, the one or more sensors is a biosensor that gathers physiological, biometric, chemical, biomechanical, location, environmental, genetic, genomic, glycomic, or other biological data from one or more targeted individuals. In another refinement, one or more biosensors collect image data and/or video data (e.g., one or more images of the subject, one or more videos of the subject, or a combination thereof) via one or more image sensors, video sensors, or a combination thereof.

In another refinement, at least one sensor $18^i$ and/or its one or more appendices thereof can be affixed to, in contact with, or send one or more electronic communications in relation to or derived from, one or more targeted subjects, including the one or more targeted subjects' body, skin, eyeball, vital organ, muscle, hair, veins, biological fluid, blood vessels, tissue, or skeletal system, embedded in one or more targeted subjects, lodged or implanted in one or more targeted subjects, ingested by one or more targeted subjects, or integrated to include at least a subset of one or more targeted subjects. For example, a saliva sensor affixed to a tooth, a set of teeth, or an apparatus that is in contact with one or more teeth, a sensor that extracts DNA information derived from a targeted subject's biological fluid or hair, sensor that is wearable (e.g., on a human body), a sensor in a computing device (e.g., phone) that is tracking a targeted individual's location information or collecting other biometric information (e.g., facial recognition, voice, fingerprint), one or more sensors integrated within a head-mountable unit such as smart glasses or a virtual/augmented/mixed reality headset that track eye movements and provide eye tracking data and recognition data, one or more sensors that are integrated into one or more computing devices that analyze biological fluid data, a sensor affixed to or implanted in the targeted subject's brain that may detect brain signals from neurons, a sensor that is ingested by a targeted subject to track one or more biological functions, a sensor attached to, or integrated with, a machine (e.g., robot) that shares at least one characteristic with an animal (e.g., a robotic arm with an ability to perform one or more tasks similar to that of a human; a robot with an ability to process information similar to that of a human), and the like. Advantageously, the machine itself can include one or more sensors and may be classified as both a sensor and a subject. In another refinement, the one or more sensors $18^l$ are integrated into or as part of, affixed to, or embedded within, a textile, fabric, cloth, material, fixture, object, or apparatus that contacts or is in communication with a targeted individual either directly or via one or more intermediaries or interstitial items. Examples include, but are not limited to, a sensor attached to the skin via an adhesive, a sensor integrated into a watch or head-mountable unit (e.g., augmented reality or virtual reality headset, smart glasses, hat, headband), a sensor integrated or embedded into a shirt or jersey, a sensor integrated into a steering wheel, a sensor integrated into a computing device controller (e.g., video game or virtual environment controller, augmented reality headset controller), a sensor integrated into a ball that is in contact with the targeted subject's hands (e.g., basketball), a sensor integrated into a ball that is in contact with the targeted subject's feet (e.g., soccer), a sensor integrated into a ball that is in contact with an intermediary being held by the targeted subject (e.g., bat), a sensor integrated into a hockey stick or a hockey puck that is in intermittent contact with an intermediary being held by the targeted subject (e.g., hockey stick), a sensor integrated or embedded into the one or more handles or grips of fitness equipment (e.g., treadmill, bicycle, row machine, bench press, dumbbells), a sensor that is integrated within a robot (e.g., robotic arm) that is being controlled by the targeted individual, a sensor integrated or embedded into a shoe that may contact the targeted individual through the intermediary sock and adhesive tape wrapped around the targeted individual's ankle, and the like. In another refinement, one or more sensors may be interwoven into, embedded into, integrated with, or affixed to, a flooring or ground (e.g., artificial turf, grass, basketball floor, soccer field, a manufacturing/assembly-line floor, yoga mat, modular flooring), a seat/chair, helmet, a bed, an object that is in contact with the targeted subject either directly or via one or more intermediaries (e.g., a subject that is in contact with a sensor in a seat via a clothing intermediary), and the like. In another refinement, one or more sensors may be integrated with or affixed to one or more aerial apparatus such as an unmanned aerial vehicle (e.g., drone, high-altitude long-endurance aircraft, a high-altitude pseudo satellite (HAPS), an atmospheric satellite, a high-altitude balloon, a multirotor drone, an airship, a fixed-wing aircraft, or other altitude systems) or another aerial computing device that utilizes one or more sensors (e.g., optical, infrared) to collect biological data (e.g., skin temperature, body temperature, heart rate, heart rate variability, respiratory rate, location data, facial recognition data, image data, and the like) from one or more targeted subjects or groups of targeted subjects. In another refinement, the sensor and/or its one or more appendices may be in contact with one or more particles or objects derived from the targeted subject's body (e.g., tissue from an organ, hair from the subject) from which the one or more sensors derive, or provide information that can be converted into, biological data. In yet another refinement, one or more sensors may be optically-based (e.g., camera-based) and provide an output from which biological data can be detected, measured, monitored, observed, extracted, extrapolated, inferred, deducted, estimated, determined, calculated, or computed. In yet another refinement, one or more sensors may be light-based and use infrared technology (e.g., temperature sensor or heat sensor) to gather or calculate biological data (e.g., skin or body temperature) from an individual or the relative heat of different parts of an individual.

In a variation depicted in FIG. 1, at least one sensor $18^l$ gathers animal data $14^k$ from each targeted individual $16^i$. At least one sensor $18^l$ can provide the information to computing device 20 or another computing device (e.g., intermediary server 22, cloud server 41). In another variation, computing device 20 can operate one or more programs to gather animal data $14^k$ (e.g., import animal data, input animal data, communicate with at least one sensor $18^l$ to gather animal data and the like) related to the one or more targeted individuals $16^i$ (e.g., characteristics/attributes such as age, weight, height, birthdate, race, nationality, habits, activities, medical history, family history, medication history, financial history, sensor-based data and the like). Therefore, computing device 20, intermediary server 22, and cloud server 41 can each be the collecting computing devices described herein. In some variations, computing device 20 can be operable to gather information from a single targeted individual or multiple targeted individuals (e.g., including one or more groups of targeted individuals), as in the case of a hospital or medical facility that uses a computing device to manage multiple patients, an insurance company or fitness organization that uses a computing device to manage multiple individuals, a sports team utilizing a computing device to manage its players, a holding company utilizing a computing device to manage groups of employees across one or more portfolio companies, and the like. In another variation, one or more intermediary servers 22 or cloud servers 41 can operate one or more programs to gather animal data $14^k$ related to the one or more targeted individuals $16^i$. The one or more intermediary servers 22 or cloud servers 41 can be operable to gather information from a single targeted individual or multiple targeted individuals (e.g., including one or more groups of targeted individuals).

Still referring to FIG. 1, one or more intermediary servers 22 (e.g., local server or other type of server) or cloud servers 41 receive and collect animal data $14^k$ from one or more sensors $18^l$, one or more computing devices 20, or a combination thereof. Collected animal data $14^k$ can include attached thereto individualized metadata, which may include one or more characteristics related to the animal data, including characteristics related to the one or more sensors, (e.g., sensor type, sensor model, sensor brand, firmware information, sensor positioning, operating parameters, sensor properties, sampling rate, mode of operation, data range, gain, other sensor settings, time stamps, and the like), characteristics of the one or more targeted individuals, origination of the animal data, type of animal data, source computing device of the animal data, data format, algorithms used, quality of the animal data, speed at which the animal data is provided, and the like. Metadata can also be associated with (e.g., attached to, included as part of, affiliated with, grouped with, linked to) the animal data after it is collected. Metadata can also include any set of data that describes and provides information about other data, including data that provides context for other data (e.g., the activity a targeted individual is engaged in while the animal data is collected, the location in which the animal data was collected, and the like; in some examples, animal data provides context for other animal data, such as the cadence at which a subject was pedaling their stationary bicycle for an acquirer who wants heart rate data for stationary-based cycling activities), rules created or modified and related to the data (e.g., how the data can be used, permissions and/or restrictions related to use of the data, other terms and/or conditions related to use of the data), and the like. It can also include information such as how the animal data has been previously used, previous acquirers of the animal data, where and when the animal data has been previously sent, previous acquisition costs of the animal data, current restrictions or guidelines related to use of the data, and the like. In some variations, such information may be contained in one or more digital records directly or indirectly associated with the animal data, the one or more targeted individuals, or both.

Other information, including one or more attributes (e.g., characteristics) of one or more targeted individuals from which the animal data originated or other attributes related to the sensor or animal data, can be added to the metadata or associated with the animal data upon collection of the animal data, or at a later time. Examples of a targeted individual's one or more attributes can include, but are not limited to, name, age, weight, height, birthdate, race, reference identification (e.g., social security number, national ID number, digital identification) country of origin, area of origin, ethnicity, current residence, addresses, phone number, gender of the targeted individual from which the animal data originated, and data quality assessment. In a refinement, the targeted individual's attributes can include information (e.g., animal data) gathered from medication history, medical history, medical records, genetic-derived data, genomic-derived data, (e.g., including information related to one or more medical conditions, traits, health risks, inherited conditions, drug responses, DNA sequences, protein sequences and structures), biological fluid-derived data (e.g., blood type), drug/prescription records, allergies, family history, health history (including mental health history), historical personal data, and the like. In the case of human subjects, the targeted individual's one or more attributes can include one or more activities the targeted individual is engaged in while the animal data is collected, one or more associated groups (e.g., if the individual is part of a sports team, or assigned to a classification based on one or more medical conditions), one or more habits (e.g., tobacco use, alcohol consumption, exercise habits, nutritional diet, and the like), education records, criminal records, financial information (e.g., bank records, such as bank account instructions, checking account numbers, savings account numbers, credit score, net worth, transactional data), social data (e.g., social media accounts, social media history, records, internet search data, social media profiles, metaverse profiles, metaverse activities/history), employment history, marital history, whether the individual is living or deceased or incapacitated, relatives or kin history (in the case the targeted subject has one or more children, parents, siblings, and the like), relatives or kin medical history, relatives or kin health history, manually inputted personal data (e.g., one or more locations where a targeted individual has lived, emotional feelings, mental health data, preferences), and/or any other targeted individual-generated data. In a refinement, one or more characteristics associated with another one or more subjects can be associated with one or more targeted individuals. For example, in the event the targeted individual has children, the child's health condition may be associated with the one or more targeted individuals as a characteristic associated with the one or more targeted individuals' data (e.g., if the child is sick, the parent may be under considerable stress or have deteriorating mental health which may impact their animal data). In another example, the one or more characteristics of the targeted individual's avatar or representation in a virtual environment, video game, or other simulation (e.g., including their actions, experiences, conditions, preferences, habits, and the like) may be associated with the targeted individual and may be included as part of the targeted individual's data. In another refinement, animal data is inclusive of the targeted individual's one or more attributes (i.e., the one or more attributes/characteristics can be categorized/characterized as animal data).

It should be appreciated that the animal data and/or various attributes related to the animal data can be anonymized or de-identified (e.g., pseudonymized). De-identification involves the removal of personal identifying information in order to protect personal privacy. In the context of the present invention, a reference to one of the words/phrases (i.e., anonymized or de-identified) should include reference to both words/phrases and similar words/phrases (e.g., semi-anonymized, partially-anonymized) where applicable, and a reference to one of the words/phrases should not be interpreted as limiting but rather as encompassing all possible meanings of the words/phrases where applicable.

In a refinement, computing device 20' mediates the sending of animal data $14^k$ to intermediary server 22 or cloud server 41, i.e., it collects the animal data from one or more sensors $18^l$, as well as from any programs operating on computing device 20 that gathers animal data, and transmits it to intermediary server 22, cloud server 41, or a combination thereof. For example, computing device 20 can be a smartphone, wrist mountable unit (e.g., smart watch), a head-mountable unit (e.g., smart glasses, virtual reality or augmented reality head set), a desktop computer, a laptop computer, or any other type of computing device. In some cases, computing device 20 is local to the targeted individual, although not required. In another refinement, one or more sensors $18^l$ may be housed within, attached to, affixed to, or integrated with, computing device 20 (e.g., as in the case of a computing device such as a smart watch, smart glasses, smart clothing, hearables, smart contact lens, augmented or virtual reality headset, any other bodily-mountable unit, and the like which include one or more sensors $18^l$ that collect animal data). In a variation, computing device 20 includes one or more sensors $18^l$ (e.g., one or more camera-based sensors in a mobile computing device such as a smartphone; one or more sensors collecting physiological, location, and/or biomechanical data in a mobile computing device such as a smartwatch; and the like). In some variations, the functionality of computing device 20 can be deployed across multiple computing devices (e.g., multiple computing devices execute the one or more actions of computing device 20). In a refinement, computing device 20 can include of multiple computing devices.

It should be appreciated that both cloud server 41 and intermediary server 22 can include a single computer server or a plurality of interacting computer servers. In this regard, intermediary server 22 and cloud server 41 can communicate with one or more other systems—including each other—to monitor, receive, and record requests for animal data to be acquired (e.g., purchased, used) based on the one or more use cases or requirements. Moreover, intermediary server 22 and cloud server 41 can be operable to communicate with one or more other systems—including each other—to monitor, receive, and record the one or more requests or distributions related to animal data. In a refinement, intermediary server 22 and cloud server 41 can be operable to communicate with one or more other systems—including each other—to monitor, receive, and record one or more uses related to animal data. In a refinement, one or more computing devices 20, intermediary servers 22, or cloud servers 41 may include be one or more unmanned aerial vehicles that perform one or more of the functions or actions of computing device 20, intermediary server 22, cloud server 41, or a combination thereof. Additional details related to an unmanned aerial vehicle-based animal data collection and distribution system are disclosed in U.S. Pat. No. 10,980,218 filed Jul. 19, 2019 and U.S. patent Ser. No. 16/977,570 filed Sep. 2, 2020; the entire disclosures of which is hereby incorporated by reference.

In a variation, intermediary server 22 communicates directly with the source of animal data $14^k$, as shown by one or more communication links 34 with one or more sensors $18^l$ or by one or more communication links 36 with one or more computing devices 20. In another variation, cloud server 41 communicates directly with the source of animal data $14^k$, as shown by one or more communication links with one or more sensors $18^l$ or by one or more communication links with one or more computing devices 20. In a refinement, intermediary server 22 communicates with the source 12 of animal data $14^k$ through a cloud server 41 or other local server. Cloud server 41 can be one or more servers that are accessible via the internet or other network. Cloud server 41 can be a public cloud, a hybrid cloud, a private cloud utilized by the organization operating intermediary server 22, a localized or networked server/storage, localized storage device (e.g., n terabyte external hard drive or media storage card), or distributed network of computing devices. In a refinement, cloud server 41 includes multiple cloud servers. In another refinement, intermediary server 22 includes multiple intermediary servers. In another refinement, intermediary server 22 operates as cloud server 41. In another refinement, cloud server 41 operates as intermediary server 22. In another refinement, both cloud server 41 and intermediary server 22 are utilized in animal data compliance system 10. In another refinement, either cloud server 41 or intermediary server 22 is utilized in animal data compliance system 10.

Still referring to FIG. 1, one or more intermediary servers 22, cloud servers 41, or a combination thereof can communicate either directly or indirectly with one or more third-party computing devices 42 via one or more communication links 44. Third-party computing device 42 (e.g., receiving computing device) is any computing device (e.g., which includes systems operating on that computing device) that can gather information (e.g., receive animal data) provided by another computing device either directly or indirectly. In a refinement, intermediary servers 22, cloud servers 41, and third-party computing devices 42 can be the one or more receiving computing devices described herein. The one or more third-party computing devices 42 are typically the acquirers of the animal data. One or more third-party computing devices 42 can include sports media systems (e.g., for displaying the collected data), sports wagering systems, insurance provider systems, telehealth systems, health analytics systems, risk analytics systems (e.g., insurance, finance), performance analytics systems, health and wellness monitoring systems (e.g., including systems to monitor viral infections, electronic medical record systems, electronic health records systems, corporate wellness systems, and the like), research systems, fitness systems, military systems, hospital systems, pharmaceutical systems, emergency response systems, financial systems, video game systems, simulation systems, and the like. It can also include systems located on the one or more targeted individuals (e.g., another wearable with a display such as a smartwatch, smart glasses, or virtual reality/augmented reality headset) or other individuals interested in accessing the targeted individual's data (e.g., a sports bettor interested in accessing the animal data from one or more targeted individual athletes on their computing device such as their mobile phone unit). In a refinement, one or more sensors $18^l$ are operable to communicate either directly or indirectly with one or more third-party computing devices 42. In another refinement, one or more computing devices 20 are operable to communicate either directly or indirectly with one or more third-party computing devices 42.

In another refinement, intermediary server 22 provides selected animal data 24 to a third party such as data acquirer 26 (e.g., via one or more receiving computing devices) for consideration (e.g., payment, a reward, a trade for something of value which may or may not be monetary in nature. A non-monetary example is a free or discounted insight or predictive indicator that has value to the provider in exchange for the provider's animal data, or a free or discounted sensor in exchange for the provider's animal data, or tokens with no cash value but valuable to the provider, or other benefit). In another refinement, the intermediary server 22 distributes at least a portion of the consideration to at least one stakeholder 30 (e.g., computing device 30). The one or more stakeholders can be a user that produced (e.g., generated) the data (e.g., the targeted subject from which the animal data is derived), the owner of the data, the data collection company, authorized distributor of the animal data, a sensor company (e.g. a sensor company that collected the acquired animal data), an analytics company (e.g., an analytics company that provided analytics on the acquired data), an application company, a data visualization company, an intermediary server company that operates the intermediary server, other rights holder, or any other entity (e.g., typically one that provides value to any of the aforementioned stakeholders or the data acquirer). In another refinement, cloud server 41 or computing device 20 operate as intermediary server 22. In another refinement, one or more data acquirers 26 or stakeholders 30 are also one or more third-party computing devices 42 and vice versa. In another refinement, the one or more receiving computing devices associated with data acquirer 26 are represented by one or more receiving computing devices 42 (i.e., the one or more receiving computing devices 42 operate as the one or more computing devices utilized by data acquirer 26 to acquire animal data).

Still referring to FIG. 1, computing device 20 can gather animal data $14^k$ from source 12 via one or more communication links either wirelessly or via one or more wired connections. Computing device 20 may also include a hardware transmission subsystem that enables electronic communication with one or more sources 12 of animal data $14^k$. In some variations, the hardware transmission subsystem can include one or more receivers, transmitters, transceivers, and/or supporting components (e.g., dongle) that utilize a single antenna or multiple antennas, which may be configured as part of a mesh network and/or utilized as part of an antenna array. The transmission subsystem and/or its one or more components may be housed within the one or more computing devices or may be external to the computing device (e.g., a dongle connected to the computing device which includes one or more hardware and/or software components that facilitates wireless communication and is part of the transmission subsystem). In a refinement, one or more components of the transmission subsystem and/or one or more of its components are integral to, included within, or attached to, the one or more sensors $18^i$. Computing device 20 may also include one or more network connections, such as an internet connection or cellular network connection, which may include hardware and software aspects, or pre-loaded hardware and software aspects that do not necessitate an internet connection. In a refinement, one or more sensors $18^i$ or intermediary servers 22 operate as computing device 20. In a variation, the one or more users interact with one or more sensors $18^i$ or intermediary servers 22 in replace of at least a portion of the functionality of computing device 20. In another refinement, one or more sensors $18^i$ or intermediary servers 22 take on one or more functions or features of computing device 20. In another refinement, one or more sources 12 of animal data $14^k$ transmits the animal data to a computing device (e.g., computing device 20, intermediary server 22, cloud server 41) via the hardware transmission subsystem. In some variations, the computing device is operable to gather animal data from multiple sensors.

In a variation, the hardware transmission subsystem can communicate electronically with the one or more sensors $18^i$ from the one or more targeted individuals $16^i$ using one or more wireless methods of communication via one or more communication links 34. In this regard, animal data compliance system 10 can utilize any number of communication protocols and conventional wireless networks to communicate with one or more sensors $18^i$ including, but not limited to, Bluetooth Low Energy (BLE), ZigBee, cellular networks, LoRa, ultra-wideband, Ant+, WiFi, and the like. The present invention is not limited to any type of technologies or electronic communication links (e.g., radio signals) the one or more sensors $18^i$ or any other computing device utilized to transmit and/or receive signals. Advantageously, the transmission subsystem enables the one or more sensors $18^i$ to transmit data wirelessly for real-time or near real-time communication. In this context, near real-time means that the transmission is not purposely delayed except for necessary processing by the sensor and any other computing device. In another variation, one or more aerial apparatus (e.g., unmanned aerial vehicle) may act as a transmission subsystem to collect and distribute biological data or other information from one or more sensors capturing animal data from one or more targeted subjects or groups of targeted subjects.

Still referring to FIG. 1, computing device 20 includes an operating system that coordinates interactions between one or more types of hardware and software. Computing device 20 can include a display device that enables the user to take one or more actions within the display (e.g., touch-screen enabling an action; use of a scroll mouse that enables the user to navigate and make selections; voice-controlled action via a virtual assistant or other system that enables voice-controlled functionality; eye-tracking within spatial computing systems that enables an eye-controlled action; a neural control unit that enables one or more controls based upon brain waves; and the like). In a refinement, a gesture controller that enables hand or body movements to indicate an action may be utilized to take one or more actions. In another refinement, the display may act as an intermediary to communicate with another one or more computing devices to execute the one or more actions requested by the user.

Typically, a display device communicates information in visual form. However, a display device may communicate animal data-based information to a user utilizing one or more other mechanisms including via an audio or aural format (e.g., verbal communication of biological readings), via a physical gesture (e.g., a physical vibration which provides information related to the one or more biological readings), or a combination thereof. In some variations, the animal data-based information communicated to a user may be the type of animal data, activity associated with the animal data, established preferences of the animal data rights holder related to the acquisition, distribution, and/or use of their animal data, or other metadata related to the animal data. For example, the display device may not communicate the signals or readings associated with the animal data for the user to interact with but may communicate the type of animal data (e.g., the display may not provide a user's actual heart rate values but may display the term "heart rate" or "HR" or a symbol related to heart rate—such as a heart— which the user can select and define terms related to their heart rate data). In another refinement, the display may not include any visual component (e.g., as in the case of a smart speaker hearables, or similar computing device that is operable via a virtual assistant to receive one or more commands and take one or more actions and does not include any visual screen to interact with. In this example, the smart speaker display may be in communication with another computing device to visualize the information if required).

In a refinement, a display may include a plurality of displays. Additionally, a display that is not included as part of computing device 20 may be in communication with computing device 20 (e.g., attached or connected to, from which communication occurs either via wired communication or wirelessly). Furthermore, the display device may take one or more forms. Examples of where one or more types of animal data may be displayed include via one or more monitors (e.g., via a desktop/laptop computer or projector), holography-based computing devices, smart phone, tablet, a smartwatch, smart speakers, smart contact lens, or within a head-mountable unit (e.g., smart glasses or other headwear including virtual reality/augmented reality headwear) where the animal data (e.g., computed asset, insight, predictive indicator, and the like) or animal data-related information can be visualized or communicated. In a refinement, the display may be operating as part of, or displaying animal data or animal data-based information via of one or more programs that include or are related to, a fitness system (e.g., a home fitness or gym application that enables users to view or access their animal data), health monitoring system, health passport system, animal data monetization system, insurance system, sports wagering system, animal performance system (e.g., human performance optimization system), telehealth system, health analytics system, risk analytics system (e.g., insurance, insurance underwriting, finance), pharmaceutical system, performance analytics system, health and wellness monitoring system (e.g., including systems to monitor viral infections), research system, military system, hospital system, emergency response system, financial system, simulation/video game system (e.g., virtual world, metaverse), media & entertainment system, and the like. In another refinement, the display may include one or more other media streams (e.g., streaming video, digital objects). For example, a fitness machine (e.g., cycling machine) may include an integrated display that enables both the visualization of media (e.g., video of a fitness instructor) along with the real-time animal data, or a computing device may be operating health monitoring program (e.g., telehealth application) which may include an integrated media module (e.g., real-time video of a doctor or medical professional) within the display alongside the real-time animal data being communicated (e.g., visualized) by the system, or a virtual environment may that includes a variety of digital objects may also incorporate animal data or animal data-based information in the virtual world, or the like.

Still referring to FIG. 1, computing device 20 can provide one or more users with access to one or more programs that include one or more accounts, profiles, portals, or the like (e.g., widgets) that allow for information (e.g., terms related to the uses of animal data) to be associated with the animal data (e.g., the user may have rights to the animal data as a rights holder, or the user may be managing the animal data on behalf of other rights holder, or the like). In some variations, the one or more programs may also enable users to provide information (e.g., input, select) as animal data or non-animal data (e.g., a user may be able to input and update their personal information via their profile), or may be set up to gather information as animal data or non-animal data on behalf of the one or more users from one or more sources. Upon accessing the one or more accounts, profiles, portals, or the like associated with the animal data either directly or indirectly via computing device 20 (e.g., a profile for an animal data rights holder that allows for the user to select or input one or more preferences related to their animal data; a portal or widget that enables a user to provide one or more instructions, commands, or other preferences related to their animal data), the one or more users can take one or more actions (e.g., make one or more selections via the computing device) to define (e.g., create, modify, establish, and the like) the one or more terms (e.g., rights granted to, or made available to, acquirers and/or receiving computing devices gathering animal data based upon one or more preferences of the animal data rights holder such as permissions, restrictions, conditions, and the like related to the animal data, including its use by acquirers and/or receiving computing devices; in some variations, permissions, restrictions, or conditions can include the length of the term, allowed uses or use cases, transferability, territories in which the animal data can be used, consideration required to access the animal data, who or what can access the data, exclusivity, derivative works and rights, and the like) associated with at least a portion of the animal data (e.g., one or more types of animal data, or a subset of the animal data; real-time animal data, near real-time animal data, historical animal data, and the like). In a refinement, the one or more terms are related to the acquisition, distribution and/or use of the animal data.

Characteristically, computing device 20 (e.g., the display device) enables one or more inputs (e.g., preferences of the animal data rights holder; instructions provided by the user related to the acquisition, distribution and/or use of animal data) to be provided by a user or program to define, at least in part, the one or more terms. The one or more inputs may be provided via the display in a physical form (e.g., touch screen to enter or select the one or more inputs; a handheld gesture controller or other physical or voice-based mechanism to enable an avatar or digital representation of oneself to make one or more selections within a video game or simulation), a voice-controlled action via a virtual assistant (e.g., verbal command to the virtual assistant via a smart speaker), an eye-tracking within spatial computing systems that enables an eye-controlled action, and the like. In a refinement, the one or more inputs may be gathered or generated by the animal data compliance system from one or more other sources of information (e.g., agreements, other profiles/accounts/portals that establish—or enable an inference of—preferences, and the like). The one or more inputs can be automated (e.g., the computing device via the display provides one or more terms from which a user can select from), inputted by a user (e.g., the user provides the terms, including manually or manual in-part from which one or more selections can be made), or a combination thereof. In a refinement, one or more inputs are provided, at least in part, by one or more animal data acquirers as part of a request by the one or more animal data acquirers for at least a portion of animal data from one or more users with one or more requested terms (e.g., established by the one or more inputs). The one or more requested terms can then be accepted, rejected, or modified by the one or more users. In another refinement, the animal data compliance system is operable to receive one or more inputs from one or more data acquirers in order for the one or more data acquirers to request animal data with one or more associated terms. The one or more associated terms can then be accepted, rejected, or modified by the user.

In a variation, the one or more inputs may enable the animal data compliance system to infer one or more other preferences of the user from which one or more terms are defined. In another variation, the one or more inputs enable the animal data compliance system to capture—either directly or indirectly—one or more preferences of the user, one or more preferences of one or more other users (e.g., in the event the animal data compliance system uses information such as inputs from other users to generate terms based upon one or more similar characteristics or attributes to the user), one or more preferences of the data acquirer, the one or more terms of the acquisition (e.g., provided by the user or data acquirer based upon a negotiation or agreement between the user and acquirer, or gathered by the animal data compliance system via the content of the one or more agreements), one or more terms of similar or dissimilar animal data acquisitions (e.g., in the event the animal data compliance system uses information gathered from one or more other agreements to create or modify one or more terms for a user), or a combination thereof. The animal data compliance system may also infer and create or modify one or more terms based upon the one or more preferences, one or more previous agreements, the scope of the acquisition/distribution or use (e.g., the terms associated with), or a combination thereof. In another variation, the one or more terms are defined, at least in part, based upon one or more agreements between the user (e.g., animal data rights holder) and the one or more data acquirers (e.g., animal data acquirers) related to the acquisition, distribution, and/or use of the user's animal data. In another variation, one or more inputs may be provided for the same animal data via multiple access points (e.g., multiple accounts, profiles, portals, widgets, or other programs). For example, an animal data rights holder (e.g., owner) and the individual that manages the animal data on behalf of the animal data rights holder may have access to the same animal data (and same animal data preferences) and may be able to provide one or more inputs (e.g., preferences) related to the same animal data. In this scenario, the animal data rights holder and individual manager may access the animal data from the same account (e.g., an account associated with the animal data) or different accounts (e.g., separate accounts associated with each individual but both linked to the same animal data). In a refinement, the system may be operable to provide multiple users associated to the same animal data with different access to create or modify one or more terms. For example, an animal data rights holder may have greater access to provide one or more preferences related to the use of their data compared to another user associated with their animal data (e.g., their animal data manager), who may have limited access with limited capabilities to provide one or more inputs. In another refinement, the system may be operable to enable one or more users to limit the ability of another one or more users to create or modify one or more terms. For example, an animal data rights holder may choose for another user associated with their animal data (e.g., their animal data manager) to have limited capabilities or limited access to establish one or more preferences related to the animal data on behalf of the animal data rights holder.

In many variations, the one or more terms associated with the animal data via the one or more inputs can be defined by the user as part of a monetization system for animal data (whereby the animal data is distributed, acquired, or used in exchange for consideration) or a system that uses animal data as collateral for consideration (e.g., using the animal in exchange for obtaining a loan), or a system that uses animal data as a form of currency. Additional details related to systems for monetizing animal data and using animal data as collateral to receive consideration are disclosed in U.S. patent Ser. No. 16/977,454 filed Sep. 1, 2020 and U.S. Pat. No. 63/242,708 filed Sep. 10, 2021; the entire disclosures of which are hereby incorporated by reference.

One or more terms associated with the animal data can be defined in a number of ways, including by acquisition (e.g., by data acquirer, by type of data being acquired, and the like), distribution, and/or use. Advantageously, one or more terms associated with the animal data can also be defined for each animal data type (e.g., a user may assign one set of rights—permissions, restrictions, conditions, and the like—to their heart rate data and another set of rights to their blood pressure data), further defined within each animal data type and each use (e.g., heart rate data collected from one activity may be assigned different permissions or restrictions vs. heart rate data for another activity; respiration data for a professional athlete for the $1^{st}$ quarter of a game may have been assigned different terms when compared to the respiration data from the same athlete in the 4th quarter of the same game), or applied to a plurality of animal data types (e.g., a user may assign/define the same rights for all their animal data or a subset of their animal data). For example, a user can define one or more terms based upon one or more parameters which may include where their animal data can be sent, who or what can access it, the platforms/environments in which the data can be accessed (e.g., a user may only consent for portions of their simulated data—which can be based on their real animal data—to be accessible in a virtual environment), what animal data can be accessed, when their animal data can be used, whether the data is identifiable, pseudonymized or anonymized, what characteristics or attributes—which can include animal data—can be associated with their animal data (e.g., sex, age, weight, height, ethnicity, body hair, country of birth, social habits, medical history, medication history, surgical history, family history, personal history, financial history, nutrition history, exercise habits, and the like paired with computed assets such as heart rate or blood pressure or ECG data or the like), rights associated with their animal data (e.g., by data type; by user type such as pharmaceutical company vs. charity organization; by vertical type such as cancer research vs home fitness; and the like) and acquiring costs (e.g., monetary or non-monetary consideration) associated with a data acquirer accessing the animal data, other terms of the data acquisition, distribution, and/or use (e.g., type of license or acquisition agreement, frequency of use, length of use, markets in which the data can be used, ways in which the data can be used, exclusivity), and a variety of other selections related to how, where, and when their animal data can be acquired, distributed, and/or used. For example, a user may want to sell their heart rate data with selected characteristics (e.g., age, weight, height) from a specific sensor during a specific activity (e.g., yoga) to any organization willing to pay a specific consideration (e.g., price) for the data sets, sell their blood pressure data for a different consideration value (e.g., another price) to organizations using the animal data exclusively for cancer research, enable their friends to access their heart rate data or its derivatives only on specific types of platforms (e.g., in fitness classes to enable real-time, head-to-head comparisons or in the metaverse), and donate their biological fluid data to any university interested in their data for the purposes of studying sweat during fitness activities.

In a refinement, a user can further define the one or more terms related to their animal data by one or more parameters including at least one of: sensor type (e.g., sensor model, sensor brand, sensing parameters, captured data), data type (e.g., raw or processed data; in some variations, at least a portion of the animal data may be available as a non-fungible token; one data type vs. another), one or more sensor operating parameters (e.g., sampling rate, mode, gain, sensing type), placement of sensor, activity (e.g., activity in which the animal data is collected), environmental condition (e.g. if the data was collected in a dangerous condition/environment, rare or desired condition/environment, and the like), bodily condition (e.g., if a person has stage 4 pancreatic cancer or other bodily condition), context (e.g., data includes a monumental moment/occasion, such as achievement of a threshold or milestone within the data collection period may make the data more valuable), duration of data collection period, quality of data (e.g., a rating or other indices applied to the data, completeness of a data set, noise levels within a data set, data format), size/volume of the data set, analytics applied to the animal data, data value (e.g., actual, perceived, future, expected), other value indicators (e.g., comparison data sets to determine data value), monetary considerations (e.g., cost to create or acquire, clean, and/or structure the animal data), non-monetary considerations (e.g., how much effort and time it took to create or acquire the data), and the like. In another refinement, the one or more data acquirers can take one or more actions (e.g., make one or more selections via the computing device) to define (e.g., create, modify, select, and the like) the one or more terms (e.g., rights such as permissions or restrictions related to use of the animal data) associated with one or more types of animal data the one or more data acquirers want to acquire. In a variation, the animal data compliance system can be operable to record and store one or more actions taken by either the user or data acquirer (e.g., selections), either locally on a computing device or via another one or more computing devices (e.g., cloud server, intermediary computing device), and make available at least a portion of the one or more actions (e.g., inputs selected or provided) for one or more future transactions (e.g., as established preferences). In a variation, the one or more actions may become part of the digital record of the user, the animal data acquirer, the animal data, or a combination thereof.

Based upon one or more existing agreements in place, which may be accessible via one or more digital records associated with each type of animal data by targeted individual or group of targeted individuals (or user), the animal data compliance system may restrict one or more selections of one or more terms. In a variation, the animal data compliance system may then provide the user or data acquirer with an opportunity to modify at least one of the one or more selections or terms, with the other party having the ability in some cases to accept or decline the one or more modified terms. In another variation, based upon one or more existing agreements (e.g., rights granted to one or more other acquirers), preferences (e.g., pre-existing preferences established and related to the acquisition, distribution, and/or use of the animal data), or a combination thereof related to the animal data, the animal data compliance system may restrict the ability to select or provide one or more inputs by the user and/or data acquirer. In a refinement, in the event the data acquirer is restricted from making one or more selections, the animal data compliance system may provide the data acquirer with an opportunity to modify at least one of the one or more restricted selections, with the user having the ability to accept, decline, or modify the one or more modified terms. In another refinement, in the event the user is restricted from making one or more selections, the animal data compliance system may provide the user with an opportunity to modify at least one of the one or more restricted selections. In another refinement, both the one or more data acquirers and the user can take one or more actions to define the one or more terms associated with one or more types of same animal data.

In a variation, the animal data compliance system may offer or provide one or more recommendations (e.g., consideration-based recommendations, rights-based recommendations) related to defining or more terms (e.g., pricing suggestions, licensing suggestions, terms of use suggestions, permissions, restrictions, preference suggestions) related to the acquisition, distribution, and/or use of the animal data and based upon the one or more characteristics related to the targeted individual, including at least one of: sex, age, weight, height, ethnicity, body hair, country of birth, social habits, medical history, medication history, surgical history, family history, social history, personal history, nutritional history, type of animal data, information derived from historical animal data, associated groups, sensor type, sensor operating parameters (e.g., sampling rate), placement of sensor, activity, environmental condition, bodily condition, context, duration of data collection period, quality of data (e.g., a rating or other indices applied to the data), size/volume of the data set, analytics applied to the animal data, other value indicators, monetary considerations, non-monetary considerations, and the like. The one or more recommendations may be derived by the animal data compliance system from information gathered related to one or more preferences by one or more data acquirers, or from one or more preferences of the user (e.g., preferences inferred and/or established based on previous patterns of preferences of the animal data rights holder), or one or more characteristics of the targeted subject (e.g., from which the animal data is derived). The one or more recommendations may be generated (e.g., created, modified) by the animal data compliance system using one or more artificial intelligence-based techniques (e.g., via one or more computing programs). The generation of the one or more recommendations may occur automatically. In a refinement, the one or more recommendations may be derived from information gathered related to one or more preferences (e.g., rights granted, permissions, restrictions) from one or more other users. For example, in a case where a user may not know how to price a specific type of data with certain permissions or restrictions attached, the animal data compliance system can be operable to automatically generate one or more recommendations based upon how other users have priced other (e.g., similar) data. Advantageously, the animal data compliance system may be operable to provide one or more recommendations for any one of the terms, or any combination of terms, selectable by the user or data acquirer. In a variation, the animal data compliance system may automatically define one or more terms associated with the animal data (e.g., including automatically creating or modifying the one or more terms). For example, one or more terms may be inferred by the animal data compliance system (or explicitly provided to the animal data compliance system) based on: (i) one or more selected user (or acquirer) preferences, (ii) one or more preferences selected by one or more other users (or other acquirers) that may share one or more characteristics with the user (or acquirer), (iii) one or more inferred user (or acquirer) preferences, or (iv) previous animal data-based transactions that have occurred based upon data provider (e.g., user) and/or data acquirer preferences. After such inferences, the animal data compliance system may generate or modify the one or more terms as part of the animal data acquisition, distribution, and/or use. In a refinement, one or more recommendations are generated based on one or more requests made by one or more data acquirers for animal data. In another refinement, one or more recommendations are generated to maximize consideration received by the user based on one or more trends identified by the animal data compliance system derived from, at least in part, all or a subset of one or more previous transactions (e.g., transactions that inform the system of what types of animal data and associated terms have received the most consideration in previous transactions, from which one or more trends can be identified).

In a variation, the animal data compliance system may generate (e.g., create, modify) one or more terms on behalf of the user. The animal data compliance system may then provide the user an ability to accept, provide consent to, or decline the one or more system-generated terms. The one or more system-generated terms may be automatically generated and associated/assigned (e.g., to the one or more types of animal data) or suggested (e.g., to the user) utilizing one or more artificial intelligence-based techniques (e.g., machine learning techniques, deep learning techniques). In a refinement, the animal data compliance system can establish one or more terms (e.g., make one or more selections for one or more rights, permissions, restrictions, conditions, and the like) to be associated with the animal data on behalf of the user. In a variation, the animal data compliance system may make one or more selections related to one or more terms on behalf of the user based upon one or more user preferences and/or characteristics. For example, the animal data compliance system may learn that the user does not want their identity associated with any selling of their animal data, so the animal data compliance system may automatically select this preference if not specified for the user. The one or more selections may occur automatically. One or more artificial intelligence techniques may be utilized to learn about the one or more user preferences in order to make the one or more selections.

Upon a user making one or more selections and establishing one or more terms (e.g., rights, permissions, restrictions) associated with the animal data, or the animal data compliance system establishing one or more terms to be associated with the animal data, or the user accepting one or more terms selected by the data acquirer, or a combination thereof, one or more rules associated with at least a portion of the animal data are created or modified by the animal data compliance system. Modification can include changing or adjusting current rules or rules previously established for any portion of the animal data, attaching previously created or adjusted rules or rules sent from another computing device to the animal data, or removal of a rule. It can also include the changing or adjusting of one or more terms by the user (e.g., a change in one or more preferences related to acquisition of the animal data can lead to one or more updates in the one or more rules) or by the animal data compliance system.

In this regard, rules include restrictions and conditions placed on the permitted uses of the animal data. The enforcement of the rules can include merely informing a user and/or programmatically restricting certain operations on the data. For example, copying, emailing, and printing of the animal data on a computing device can be disabled. Moreover, the one or more rules can be derived (e.g., created, modified) either directly or indirectly from one or more terms associated with the animal data (e.g., as created, modified, agreed upon, or accepted by the user), which can include one or more selected or established preferences (e.g., of the user), inferred preferences (e.g., of the user), and the like. The one or more rules can also be derived from the one or more user actions, including both direct actions (e.g., a user selects an option to enable their heart rate or ECG data to be sold to pharmaceutical companies for consideration specified by the user, and in turn one or more rules are created), as well as indirect actions (e.g., the computing system utilizes one or more machine learning techniques to find patterns in the user's actions and automatically creates one or more rules that are derived from the actions). In a variation, the one or more rules can be derived from one or more system actions. In another variation, the one or more rules can be created or modified based upon one or more characteristics (e.g., attributes) of the targeted subject (e.g., which may also be the user). In a refinement, the one or more terms may be converted by the animal data compliance system into one or more instructions that are utilized by the animal data compliance system to create or modify the one or more rules. In another refinement, all the terms for any given transaction (e.g., related to the distribution, acquisition, or use of animal data) or use case are included in the one or more rules. In another refinement, only a portion of the one or more terms for any given transaction or use case are included as part of the one or more rules. In another refinement, different rules are created based upon the same terms for different computing devices (e.g., receiving computing devices) within the same transaction or use case. In another refinement, different rules are created based upon the same terms for the same transaction or use case. In another refinement, one or more rules featuring at least a portion of the same terms are provided to two or more receiving computing devices.

In another variation, the one or more rules are created or modified based upon one or more instructions provided either directly or indirectly by the user (e.g., data owner, data provider, data manager, the subject generating the data). In some variations, the one or more instructions establish and provide the one or more terms (e.g., the one or more permissions, restrictions, conditions, and associated rights established related to use of the animal data) associated with the animal data. The one or more instructions may be provided by the user via a display device (e.g., via an input option such as a selection option or other preference establishment option) or other communication mechanism (e.g., audio command, hand gesture command, neural commands via brain signals, and the like). In this example, instructions can include inputs, preferences, or other actions of a user based upon interaction with the display device from which instructions can be directly or indirectly extracted or deduced. In a refinement, one or more artificial intelligence techniques are utilized to create or modify the one or more instructions. Upon the creation or modification the one or more terms via the one or more instructions, the animal data compliance system generates the one or more rules and associates the one or more rules with the relevant animal data. In a variation, the computing device may convert the selected one or more terms related to the animal data into one or more rules that are then communicated to one or more computing devices. Advantageously, the data owner or provider can create different terms (e.g., permissions, restrictions, rights related to the acquisition of the animal data) for different types of animal data (e.g., blood pressure data vs blood glucose data), different terms for the same animal data, and different terms within the same data set. For example, a user may allow for their heart rate data to be sold only to pharmaceutical companies while restricting the sale of their ECG data but allowing their ECG data to be donated to any charity associated with heart disease. In another example, a professional athlete user may want their heart rate data and associated predictive indicators to be sold to sports betting companies in a specific territory (e.g., United Kingdom) or on a specific platform (e.g., mobile only) only for only specific periods of time (e.g., the 1st and 3rd quarters of the game). In another example, a subject utilizing a wellness monitoring system that collects their animal data may provide their blood glucose data to a pharmaceutical company on an exclusive basis amongst pharmaceutical companies but provide the same blood glucose data to a diabetes research organization on a non-exclusive basis so that other diabetes research organizations can access it. In a refinement, the animal data compliance system enables the same animal data to be distributed (e.g., which can include being sold) or acquired with different terms attached for each distribution or acquisition while retaining (e.g., storing, making available, creating, updating) one or more electronic records (e.g., digital records) associated either directly or indirectly with the animal data, the user, or both. The animal data compliance system's one or more digital records that include the one or more terms associated with the animal data may be operable to prevent or restrict a user from authorizing one or more uses of the data by implementing one or more control mechanisms via the display device that restrict one or more user actions in order to prevent unauthorized distribution of data based upon one or more existing agreements. For example, the animal data compliance system may restrict a user from selecting one or more preferences via the display based upon one or more existing agreements. The digital record also enables the user to manage the rights associated with the animal data (e.g., providing a record of how, when, and/or where the animal data has been used; in some variations, it can also include the terms for future acquisitions, distribution, and/or uses).

In a refinement, the one or more rules are provided to a receiving computing device with one or more instructions related to how at least a portion of the animal data can be further acquired, distributed, or used by one or more other computing devices. In this refinement, the one or more rules may include one or more terms associated with the animal data for future acquisitions, distributions, and/or uses. This means that the animal data compliance system may be operable to enable the user to select the one or more terms for both current and future (e.g., not yet contracted or completed) acquisitions, distributions, and/or uses related to their animal data (e.g., the data owner can contemplate the terms associated with the use of their animal data by the receiving computing device as well as how one or more other computing devices acquiring their animal data from the receiving computing device can acquire, distribute, and/or use their data).

In another refinement, the animal data compliance system creates or modifies the one or more rules related to acquisition, distribution, and/or use of the animal data for any given transaction based upon the one or more terms. In a variation, the animal data compliance system may then associate the one or more rules with the animal data, distribute the one or more rules to one or more computing devices (e.g., receiving computing devices), or a combination thereof (e.g., associate the one or more rules with the animal data and distribute the one or more rules to one or more computing devices). For example, the user may sell their animal data to an acquirer with specific terms associated with its sale. Based upon the terms of the transaction, the system may then create one or more new rules or modify one or more existing rules (or a combination thereof) associated with the animal data to provide to one or more existing acquirers of the same animal data with the updated one or more rules (e.g., to update their permitted uses if applicable). In another refinement, the animal data compliance system provides at least a portion of the one or terms to another one or more computing devices to create or modify at least a portion of the one or more rules. In another refinement, the animal data compliance system instructs one or more other computing devices to create or modify the one or more rules based upon the one or more terms.

In another variation, multiple rules can be created for the same animal data. In a refinement, a plurality of rules are associated with the same animal data. For example, a user may establish a preference (e.g., from which a rule is created) that enables their ECG data to be sold in a pseudonymized form as part of a group of ECG data (e.g., as part of a fitness class, a soccer team, or categorized group based upon one or more attributes such as age, weight, height, gender, and the like) from a group of targeted users but provides another one or more preferences (e.g., another rule) that does not allow for the same ECG data to be sold individually in a pseudonymized form. In another refinement, a single rule can provide multiple terms (e.g., multiple preferences communicated via a single rule). In another refinement, a single rule of the one or more rules includes a plurality of rules. For example, a data owner may request to restrict or limit data to be sold for consideration only for first n number of data points (e.g., the first 30 minutes of data, which may consist of n number of data points) or until the sale of the animal data achieves a specific target (e.g., n number of dollars or tokens), after which the data owner may provide the animal data for free, increases the price of the data, or stop access to the data. In another variation, the one or more rules may be created or modified wherein the one or more rules change automatically based upon one or more variables (e.g., future variables). For example, a data owner may only sell their animal data for the first year to a specific segment of companies (e.g., only healthcare companies) at a specific price but make their animal data available to a wider group of companies (e.g., healthcare and pharmaceutical companies) at a lower price after the first year.

In another variation, at least a subset of the one or more rules are automatically created or modified by the animal data compliance system based on one or more user preferences or characteristics (e.g., user attributes). User preferences or characteristics may be created and/or learned by one or more inputs provided via the display device (e.g., a user makes a selection via the display device to enable the sale of their animal data). User preferences or characteristics may also be created or learned based upon previous inputs via the display device related to previous animal data transactions (e.g., distributions, acquisitions, uses), or may be inferred based upon user inputted or system-gathered information related to the user. In a refinement, user preferences or characteristics may be created and/or learned by the animal data compliance system based upon observing user behavioral patterns, either in the real-world, a virtual environment (e.g., virtual world), or a combination thereof. In another variation, the animal data compliance system may automatically define one or more terms on behalf of the user. In some cases, the animal data compliance system may require consent from the user prior to implementing the one or more selections (e.g., consent prior to creating or modifying the one or more terms or the one or more rules). Consent may be explicit (e.g., providing notice to the user of the one or more rights defined by the animal data compliance system, and requiring the user consent to the association of the one or more rights to the animal data) or inferred (e.g., automatically provided based upon user preferences established with other animal data or from trends derived from other data/inputs provided).

Upon creation or modification of the one or more rules, the one or more rules are associated with at least a portion of the animal data. The term "associated" includes both attached to and assigned to the animal data and vice versa (e.g., "attached" includes both "associated" and "assigned to"), as well as terms with similar meanings. In a variation, at least a subset of the one or more rules are associated with (e.g., attached to) the animal data as metadata. For example, the one or more rules may be included as metadata as part of the animal data (e.g., the animal data's metadata includes the one or more rules). In another variation, at least a portion of the one or more rules are embedded within the animal data (e.g., such that it moves along with the animal data as a unit). Upon associating the one or more rules with the animal data, at least a portion of animal data and the one or more rules are provided to one or more computing devices (e.g., in one or more formats readable by the one or more computing devices, one or more humans, or both). In this context, "provided" includes sent, made available and the like. The animal data and its corresponding one or more rules can be provided at the same time or at different times. The one or more rules can be provided directly (e.g., sent) or indirectly (e.g., made available to another computing device via cloud server 41). For example, the animal data can be accessed by another computing device such as third-party computing device 42 via cloud server 41, the animal data can be sent from computing device 20 to intermediary server 22 in order to be accessed by third-party computing device 42, sent from sensor 18$^i$ to cloud 40, sent from sensor 18$^i$ to computing device 20 in order to be accessed by intermediary server 22, and the like. It should be appreciated that there are multiple ways and configurations which enable the animal data to be sent from one computing device to another. It should also be appreciated that the computing device receiving the animal data directly or indirectly from the user's computing device may be an intermediary computing device that brokers the acquisition or distribution of animal data between the data provider and the data acquirer (e.g., as in the case of an animal data marketplace or exchange developed for the distribution and acquisition of animal data for consideration, insurance provider that acquires animal data in exchange for rewards, health or wellness provider that acquires animal data in exchange for personalized insights or monetary consideration, a system that uses animal data as collateral to receive consideration, or other monetization system for animal data). For example, computing device 20 may communicate with an animal data monetization system such as an animal data marketplace, which may be hosted by intermediary server 22 or cloud server 41, for the purposes of targeted individual 16' selling acquirer-selected animal data 24 to one or more data acquirers 26 or via their receiving computing devices 42.

In a refinement, the one or more rules associated with the animal data that provide the one or more terms related to the distribution, acquisition, or use of the animal data are sent to one or more receiving computing devices, upon which the one or more receiving computing devices provide at least a subset of the one or more rules to another one or more receiving computing devices (e.g., as in the case of an intermediary computing device that is selling or distributing the animal data on behalf of a data rights holder to one or more other parties, whereby the user provides the terms for how/when/where/etc. the animal data can be distributed, acquired, or used to the intermediary computing device, and at least a subset of the terms are provided via one or more rules by the intermediary computing device to the one or more data acquirer based upon the scope of their acquisition). In another refinement, the one or more rules associated with the animal data that provide the one or more terms related to the distribution, acquisition, or use of the animal data are sent to one or more receiving computing devices (e.g., as in the case of the one or more rules being sent directly from the user or their associated one or more computing devices to the animal data acquirer based upon one or more agreements directly with the data acquirer as part of the animal data acquisition or preferences established by the user that are intended for the acquirer).

In a refinement, one or more rules provided in any useful format such as XML, JSON, CSV, or the like. Advantageously, the formats can be a proprietary to the providing computing device. Typically, the rules are encrypted or otherwise protected from being maliciously or inappropriately changed.

Referring to FIG. 1, when the animal data compliance system 10 is ready to provide the one or more rules to another one or more computing devices, the one or more receiving computing devices obtain one or more certifications prior to animal data compliance system 10 enabling access to the animal data. A certification can be an acknowledgement or agreement between two or more computing devices, at least one of which is a receiving computing device that receives at least a portion of the animal data, in regards to acceptance of the one or more terms established for, and associated with, the animal data (e.g., the received animal data). In a variation, a certification can be an acknowledgement or agreement between two or more computing devices, at least one of which is a computing device that provides at least a portion of the animal data, and at least one of which is a receiving computing device that receives at least a portion of the animal data, in regards to acceptance of the one or more terms established for, and associated with, the animal data (e.g., the received animal data). In another variation, a certification can be an acknowledgement or agreement between the providing computing device or other computing device (e.g., other certifying computing device)

in relation to the acquisition of animal data by the one or more receiving computing devices, or the process related to acceptance of the one or more terms. For example, a certification can represent that the animal data is ready to be provided by one computing device and received securely by a receiving computing device, the data acquirer (via the receiving computing device) agrees to comply with the one or more terms established by the user, an authorization based upon receiving a valid license for use of the animal data, a legal acceptance of the one or more rules by the data acquirer (via the receiving computing device), and the like. In a variation, the computing device generating the one or more rules (e.g., generating computing device), providing at least a portion of the animal data (e.g., with the associated one or more rules), providing the one or more rules (if different from the computing device generating the one or more rules or providing at least a portion of the animal data), or a combination thereof requires compliance related to the one or more rules from the one or more receiving computing devices (e.g., agreement from the one or more receiving computing devices to abide by the one or more rules). In a refinement, the computing device provides one or more certifications to the one or more receiving computing devices based upon its compliance related to the one or more rules. In a further refinement, the one or more receiving computing devices implement one or more lines of executable code upon receiving the one or more certifications that notify, instruct, enable, or prevent (e.g., restrict) one or more actions related to use of the animal data based upon the terms. The one or more lines of executable code can be provided by the computing device providing the animal data to the one or more receiving computing devices, which may be included as part of the one or more rules, in the metadata associated with the animal data, embedded within the animal data, or a combination thereof.

As part of this certification, an agreement is established based upon the one or more rules between a computing device (e.g., a collecting computing device; a computing device that provides/sends the animal data, such as the user's computing device, which may also be the collecting computing device) and the receiving computing device. The agreement between the providing (e.g., sending) and receiving computing devices can take place prior to the animal data being sent, during transit (e.g., the animal data is sent, and upon receipt, the receiving computing devices accepts the terms associated with the animal data via the one or more rules), or upon receipt of the animal data by the receiving computing device. The agreement can be in the form of a digital agreement that is executed between two computing devices. The agreement can be brokered by an intermediary system (e.g., such as a marketplace-based system for animal data or animal data-based collateral system) or can occur directly between the providing and receiving computing devices. The agreement can also be between a computing device that authorizes the providing of the animal data from another computing device to the receiving computing device (e.g., in the event the user's computing device does not contain all of their animal data for distribution). The agreement can be a legally-binding digital handshake that includes one or more licenses or other type of grant providing the agreed-upon terms (e.g., which includes the permissions, restrictions, other rights and terms associated with the acquisition and use of the animal data) related to the animal data. The agreement can also be included as part of the metadata. In some variations, upon receiving the animal data and its corresponding metadata (which can include the license or other grant), a legally binding agreement can be established between the acquirer (e.g., licensee) and user (e.g., licensor), whereby the receiving computing device agrees to abide by the terms established by the user. This agreement may legally bind the one or more receiving computing devices (e.g., the one or more individuals, entities, or the like associated with the one or more receiving computing devices acquiring the data) from taking one or more actions (e.g., prevent specific use of the data, prevent sending the data to other systems, and the like). In some variations, the legally-binding agreement may be automatically generated by the providing computing device and executed between the sending and receiving computing devices.

A certificate can be provided by the collecting computing device that associates the one or more rules with the animal data prior to distribution. In a refinement, the collecting computing device, the generating computing device, and the providing computing device are the same computing device. In another refinement, the collecting computing device, the generating computing device, and the providing computing device are two or more computing devices. In another refinement, a combination of the collecting computing device, the generating computing device, and providing computing device are the same computing device.

The certificate can act as the digital agreement and authenticates that the receiving computing device agrees to the one or more rules related to the animal data (e.g., use of the data), as well as any other terms, conditions, or policies required or to be complied with as part of the agreed access and use. In many cases, the certificate acts as a legal agreement between the two computing devices (e.g., the sender of the data and receiver of the data), providing a license or other type of rights grant to the receiving computing device. The certificate can contain one or more encryption techniques (e.g., keys) that allow the receiving computing device to access the animal data upon its acceptance. In most cases, the one or more encryption keys are unique to the computing device or the licensee/grantee (e.g., a single acquirer), preventing unauthorized access, use, or distribution. In some cases, further encryption keys will be provided by data type or other terms established under the license or other type of rights grant. In a refinement, the one or more encryption keys can be unique to the animal data or other variable (e.g., time).

In a variation, in order to provide the animal data and the one or more rules from one computing device to another, at least a portion of the animal data and the one or more rules are obfuscated (e.g., which for definition purposes includes encrypted, compressed, and the like) and sent over one or more networks to one or more computing devices. In another variation, the animal data which includes the metadata providing the one or more rules is encrypted, with access provided upon the receiving computing device receiving certification (e.g., authorization based upon obtaining a valid license). In another variation, animal data provided is encrypted and the receiving computing device cannot access the animal data until the receiving computing device agrees to abide by the terms established by the user via the one or more rules. In order for the receiving computing device to abide by the terms, it requires access to the terms. In this variation, the one or more rules are provided with the animal data but one or more separate encryption keys are provided for the one or more rules. In some variations, the one or more rules may not be encrypted or partially encrypted. Once the one or more rules are agreed to by the receiving computing device (and in some variations consideration provided), the providing computing device can provide the one or more encryption keys for access to the animal data.

In the event that the receiving computing device sends the animal data to another third-party computing device, one or more new encryption keys may be required. In the event a third-party computing device requests access to the animal data, the receiving computing device may direct the third-party computing device to the originating computing device or a centralized server to receive one or more certificates in order to access the animal data. In a variation, the receiving computing device may create its own certificate (with one or more corresponding encryption keys) that complies with the original certificate provided by the originating computing device that may include one or more changes (e.g., additions) or amendments to the one or more rules based upon one or more selected user preferences (e.g., updated preferences) or derived by the animal data compliance system (e.g., by one or more artificial intelligence techniques, which may occur automatically). The originating computing device may then be provided notice by the receiving computing device directly or via another computing device (e.g., central server). In some cases, the originating computing device or central server may provide an approval (e.g., authentication) for the receiving computing device's newly-created certification prior to the receiving computing device distributing the one or more encryption keys to the third-party computing device. In a refinement, one or more forms of tokenization may be utilized, at least in part, to provide at least a portion of the animal data from one computing device to another.

Upon receiving the animal data and the associated one or more rules, the one or more receiving computing devices can be notified (e.g., informed, alerted) of one or more terms (e.g., permission, restrictions, conditions, or other rights) related to the animal data (e.g., via the associated metadata). For example, the animal data received may have instructions attached in the metadata (e.g., via the rules) that permit one or more use cases for the animal data (e.g., the targeted individual's heart rate data is permitted to be distributed for sale to health analytics companies) but prohibit another (e.g., the targeted individual's blood pressure or ECG data is not permitted to be distributed other than to research organizations that are studying heart disease). In this case, the one or more rules can specify information such as the type of animal data the user has made available for distribution (e.g., sale, acquisition), terms related to its distribution (e.g., terms of use, including permissions, restrictions, conditions, and other rights), terms related to any animal data that has not been made available for distribution or use (if received by another computing device), and the like. In another variation, the one or more receiving computing devices are notified of the one or more rules prior to receiving the animal data and agree to comply with (e.g., accept) the one or more rules prior to receiving the animal data by taking one or more actions (e.g., digitally signing an agreement). In another variation, the one or more rules inform receiving computing devices about allowable and/or prohibited uses of the animal data that are based upon the one or more terms. In another variation, the one or more terms associated with animal data and received (i.e., via the one or more rules) by the one or more receiving computing devices inform the one or more receiving computing devices of the one or more permissions, restrictions, conditions, and other rights associated with their acquisition and use of the animal data. In another variation, the one or more rules induce the one or more receiving computing devices to take one or more actions based upon the one or more terms.

In a refinement, one or more alerts are created or modified based upon the one or more rules. An alert can be any type of notification. Alerts can be created by the one or more receiving computing devices related to the content of the one or more rules (e.g., the terms). Additionally, the one or more rules may provide one or more instructions related to the content of the alert, type of alert, and frequency of alerts. In a variation, the one or more rules provided with the animal data (e.g., as part of the metadata) may create one or more alerts that provide a form of notice to the receiving computing device related to one or more actions that can or cannot be taken related to the animal data. For example, an acquiring computing device may receive a notification prior to sharing the acquired animal data that it is not permitted to share the user's heart rate data on a specific type of platform, or with a specific type of company, or for a specific duration of time, or in a specific territory, or for a specific use case, or the like. Alerts may also occur on the computing device sending the animal data (e.g., notification to the data owner that their data has been sent to another computing device with various uses and restrictions attached, or a sale has occurred with specific terms attached). One or more alerts may be provided to the one or more users, to the providing computing device (e.g., sending computing device), to the one or more receiving computing devices, or to any other systems. For example, an alert may occur when a transaction is completed, whereby the data seller and data acquirer receive an alert with the transaction details. In this example, one or more other parties may also receive an alert when the transaction is completed. For example, if a sensor or analytics company is participating in a revenue sharing opportunity as part of the user's distribution of their animal data, the sensor or analytics company may also receive an alert notifying the company of details pertinent to their company and the transaction. Note that not all information provided in an alert derived from the same transaction to multiple parties may be the same. Some alerts within the same transaction may provide more (or less) or different details than other alerts, which may be a tunable parameter by the user, other individual/entity creating and sending the alerts, or the system. In some cases, multiple alerts sent to the same user—or users affiliated with the same animal data—may also be different. For example, a user (e.g., data creator) may provide data to another computing device, and the user may receive one type of alert related to the transaction and another user affiliated with the same animal data (e.g., the data creator's representative or lawyer) may receive another type of alert. In a refinement, one or more alerts can be automatically generated and communicated on a receiving computing device based upon, at least in part, the one or more terms via the one or more rules (e.g., the one or more rules provided to a computing device receiving the animal data includes embedded code that can run on the receiving computing device, wherein the embedded code automatically creates and communicates one or more alerts that include content related to the one or more terms on the receiving computing device).

In some variations, alerts may be based on a receiving computing device's request (e.g., data acquirer's request) for a specific type of animal data from a specific targeted individual, group of targeted individuals, user (e.g., if a user manages multiple data creators who generate high quality data), or group of users. The user may get notified via an alert on a computing device. In some cases, the alert may be in the form of a pop up or similar notification where the alert appears on the screen (or is communicated to the user—e.g., via audio), enabling one or more actions by the user (e.g., a "one-click" accept button on screen that enables the user to accept, decline, or modify an offer related to the acquisition (e.g., sale), distribution and/or use of their animal data with one or more terms attached, which may be particularly useful in applications such as fitness classes or health platforms or in virtual environments whereby the user can quickly accept an offer from a data acquirer to acquire their animal data for consideration via an alert or other type of notification. In this scenario, the display device may provide the user with at least a portion of the one or more terms (e.g., a summary) and/or details of the terms related to the acquisition of the animal data (if different), with the terms being created or modified by the animal data compliance system based upon the one or more inputs, system-derived inferences based upon the one or more inputs, and the like. The terms can be generated using one or more artificial intelligence techniques).

In another variation, the receiving computing device may create or modify one or more rules related to the received animal data. In this case, the receiving computing device may provide (e.g., send, make available) the one or more creations of, or modifications to, the one or more rules back to the originating computing device (e.g., or make available via a central server). In the event these rules are not created based upon user preferences, either the originating computing device or receiving computing device or other computing devices in communication with these computing devices may confirm the new or amended rules with the user. In some variations, the user may have the ability to amend the newly amended rules, at which time the user-led amendments would be provided back to the originating computing device or receiving computing device or other computing devices in communication with the one or more computing devices for approval. Upon acceptance of the one or more rules, the one or more rules can be added to the certificate and associated with the animal data (e.g., added to the metadata). In another variation, the one or more certificates can be modified (e.g., updated, changed) as one or more new rules are created. For example, if the user updates their preferences (e.g., permissions, restrictions, conditions, and the like) on a computing device and the computing device creates one or more new rules that are associated with the animal data, computing devices that have accessed/received the data may be required to be re-certified with the new one or more rules in order to be in compliance with the permissions or restrictions or other rights established. Notice may be provided to each computing device that has accessed/received the data requiring new certification based upon the one or more changes to the one or more rules.

In a refinement, the originating computing device may require the receiving computing device and/or any other third-party computing device to obtain permission (e.g., be granted access) for any one or more actions taken with the animal data. This may occur by checking the one or more actions against a central server. For example, the computing device may run an operating system that monitors and enables or prevents any given action related to the animal data (e.g., sending the data to another computing device, incorporating the data into models that are utilized to create products, preventing data from being used in a specific way or for a specific purpose) based upon the rules associated with the animal data, enabling the central server to act as a central licensing authority (or rights) that monitors and regulates use of the animal data. In a variation, one or more encryption keys are associated with one or more computing devices (e.g., central server) that check each use of the data and regulates the one or more uses of the data by the receiving computing device. In this scenario, every time the receiving computing device uses the one or more keys, the use is checked against the central server to determine whether it is a permitted use. The central server can be operable to invalidate the one or more keys based on restricted use or access.

In another refinement, one or more rules can be created or modified for gathered ancillary data (e.g., contextual data) associated with animal data. For example, a user may create or modify one or more terms (e.g., establish one or more preferences) for ancillary data (e.g., historical contextual data; real-time or near real-time contextual data; non-contextual data) directly or indirectly associated with animal data, directly or indirectly associated with the user, or data that the user has one or more rights to (e.g., ownership of the ancillary data, a license to the ancillary data, or the like), for which one or more rules can be created or modified. In some variations, ancillary data may include at least a portion of animal data, non-animal data, or a combination thereof. Using sports as an example, ancillary data can include, but is not limited to, traditional sports statistics collected during an event (e.g., any given outcome data, including game score, set score, match score, individual quarter score, halftime score, final score, points, rebounds, assists, shots, goals, pass accuracy, touchdowns, minutes played, and other similar traditional statistics), in-game data (e.g., whether the player is on-court vs off-court, whether the player is playing offense vs defense, whether the player has the basketball vs not having the basketball, the player's location on the court at any given time, specific on-court movements at any given time, who the player is guarding on defense, who is guarding the player on offense), streaks (e.g., consecutive points won vs lost; consecutive matches won vs lost), comparative data to similar and dissimilar players in similar and dissimilar situations (e.g., other player stats when guarding or being guarded by a specific player, playing against a specific team) injury data (e.g., including history), recovery data (e.g., rehabilitation data), training data (e.g., how the player performed in training in the days or weeks leading up to a game), nutrition data, a player's self-assessment data (e.g., how they're feeling physically, mentally, or emotionally), and the like. It can also include information such as competition (e.g., is it a men's competition, or women's competition, or other competition), round (e.g., quarterfinal, finals), match (e.g., player A vs. player B; team A vs team B), date, time, location (e.g., specific court, arena, field, and the like), country of origin, country of birth, age, weight, height, number of years associated with the event (e.g., number of years a player has been playing within a specific league), ranking or standing/seeding, height, weight, dominant hand or handedness (e.g., right hand dominant vs left hand dominant), residence, equipment manufacturer, coach, race, nationality, habits, activities, genomic information, genetic information, medical history, family history, medication history, and the like. Ancillary data can also include career statistics (e.g., in the case of individual athletes in racquet sports as an example, number of: tournaments played, titles, matches played, matches won, matches lost, games played, games won, games lost, sets, sets won, sets lost, points played, points won, points lost, retirements, and the like). Ancillary data can also be scenario-specific. For example, in the sport of tennis, ancillary data may be information related to when a player is winning 1-0 or 2-1 in sets or losing 1-2 or 0-2 in sets, or time of day the player is playing, or the specific weather conditions the game is played in. Ancillary data can also be related to head-to-head match ups. In the sport of squash for example, head-to-head information can be related to the number of head-to-head matches, games, number of times a player has been in a specific scenario vs the other player (e.g., in terms of game score: 3-0, 3-1, 3-2, 2-3, 1-3, 0-3, 2-0, 2-1, 1-2, 0-2, or retired). Ancillary data can also include how that player has performed in that particular tournament (e.g., matches played, matches won, games played, games won/lost, sets played, sets won/lost, court time per match, total court time, previous scores and opponents, and the like). Ancillary data can also include points won vs. points played, games (e.g., sets) won vs. games played, matches won vs. matches played, any given round rate (e.g., finals win/loss rate or semi-finals win/loss rate; number of times a player makes any given round in any given tournament (e.g., number of times a player makes the semifinals in any given tournament, which may on a yearly or career basis), title win rate (e.g., how many times the player has won this year or any given year or over a career; how many times a player has won that particular tournament), match retirement history, and the like. Ancillary data can also include data such as environmental temperature data, court temperature data, humidity data, location, elevation data, and barometric pressure data, time, elevation data, and the like. It should be appreciated that such examples of ancillary data are merely exemplary and not exhaustive, and similar types of information can be collected for other sports and events. Additionally, a similar type of gathered information (e.g., statistical, quantifiable, characterizable, and the like) associated with animal data in non-sports settings may also be categorized as ancillary data (e.g., including information gathered related to health & wellness, media consumption/social media, social interactions, financial transactions, insurance, transportation, food & beverage, lodging, and the like). In a refinement, the ancillary data may be included as metadata associated with the animal data. In another refinement, ancillary data in the context of non-sports related events can also include outcome-related information that may or may not provide context to other data.

Upon receiving the animal data and the associated rules, the receiving computing device takes at least one action based upon the one or more rules. In this context, an action can be any action that is directly or indirectly related to the animal data. An action includes an action that is derived from (or results from) the animal data or its one or more associated terms. It can be, for example, an action to confirm or authenticate the availability of a portion of the animal data for sale, an action to notify a potential customer that the animal data is available, an action to notify the user that their data is now available for sale, an action to analyze the data, an action to transform the animal data (e.g., normalize, timestamp, aggregate, clean, tag, store, manipulate, denoise, process, enhance, organize, visualize, anonymize, analyze, synthesize, summarize, replicate, productize, or synchronize the animal data), an action to send the data to another computing device, an action to display the data, and the like. In a variation, an action can also include an action to take no action at all.

In a refinement, the one or more rules are related to providing animal data for consideration. This includes informing, instructing, or enabling a computing device to provide animal data to another one or more computing devices for consideration, informing the receiving computing device of the one or more terms (e.g., permissions, restrictions, conditions, rights) associated with its distribution for consideration, and the like (e.g., which includes preventing the sale or distribution of animal data as well). Consideration includes payment (e.g., cash, cryptocurrency, tokens, virtual currency), a reward, a trade or exchange for something of value which may or may not be monetary in nature (e.g., goodwill, tangible goods, store credit, an insight or predictive indicator related to the targeted subject or user—if different—that provides value to the targeted subject or user). In a variation, the one or more outcomes of the one or more rules is that the animal data is provided to one or more computing devices for consideration. In another variation, the one or more rules are attached to the animal data as part of the one or more terms of the acquisition/distribution or exchange of animal data for consideration. In another variation, the one or more rules attached to, or associated with, the animal data provide one or more terms related to acquisition/distribution or exchange of at least a portion of the animal data for consideration. In another variation, the one or more rules attached to (or associated with) the animal data provide one or more terms for the acquisition/distribution of animal data in exchange for consideration.

In another variation, the one or more rules are automatically implemented on the one or more receiving computing devices. For example, upon receiving the animal data, one or more lines of executable code may be implemented automatically on the receiving computing device upon receipt of the animal data (e.g., upon accessing the heart rate data by the receiving computing system for a given user, a notification may be provided to the receiving system outlining the terms and license related to its use. In some variations, the notification may include an option for the receiving computing device to accept the one or more terms related to its use of the animal data—one example is by taking an action which may include clicking an "accept" button—from which the action automatically implements one or more lines of executable code that enforce the one or more terms on the receiving computing device or to ensure that the receiving computing device abides by the one or more terms). Similarly, one or more scripts may occur automatically, or may be created automatically by one or more artificial intelligence techniques.

In another variation, the one or more rules instruct, alert, enable, or prevent (e.g., including limit) one or more actions related to the animal data on the one or more receiving computing devices. In a refinement, the one or more actions are created, modified, or taken utilizing one or more artificial intelligence (AI) techniques. The AI may create, modify, or take the one or more actions automatically. The one or more actions may be based on one or more direct or indirect commands via one or more inputs (e.g., instructions) provided by the user (or which may result from the one or more preferences selected by or established for the user) and incorporated in the one or more rules, or the one or more commands or inputs provided by another one or more computing devices. In another refinement, the animal data compliance system is operable to prevent (e.g., including limit) or enable access to the animal data by the one or more receiving computing devices. For example, utilizing preferences established by a professional athlete user in the context of sports betting using heart data:

User permits for real-time heart rate data to be sold to all sports betting companies in the UK and Germany, and Company Z in the US for 1st and 2nd quarters only;

User restricts that their real-time heart rate cannot be shown for a duration longer than 10 seconds at any given time User requires that their real-time heart rate data must be sold for $1.24 per API call (with each API call happening per second); and User permits for Company Z to purchase their historical ECG data for the 2nd quarter of the last 25 games played for $135.23 per API call (with each API call providing a an ECG data set that encompasses a single $2^{nd}$ quarter of single game).

In this example, the animal data compliance system can limit or enable access to the animal data—or select portions of the animal data—by one or more receiving computing devices. For example, if a rule is established based upon user preferences, computing device 20 may take one or more actions based upon the one or more rules (e.g., prevent or limit access to that company or type of company if the user prefers not to have their data distributed to a specific type of company). In some variations, the receiving computing devices provide information (e.g., company name or identification, industry/vertical they are in, intended uses of the data, actual uses of the data, market(s) of operations, market(s) where data will be used, markets where the data is used, revenues generated from the animal data, and the like) that enable computing device 20 to take the one or more actions. In a refinement, the animal data provided to the one or more receiving computing devices can be accompanied by one or more lines of executable code that enable or limit one or more actions on the one or more receiving computing devices.

In another variation, one or more artificial intelligence techniques are utilized to create or modify one or more rules. In a refinement, the one or more rules are created or modified based upon one or more user preferences or characteristics (e.g., attributes). In particular, one or more rules are created or modified based upon one or more instructions either directly or indirectly provided by the user. For example, by utilizing one or more artificial intelligence techniques such as machine learning techniques, the animal data compliance system can analyze previously-collected and current data (e.g., a user's selection preferences, similar types of users and their selection preferences, behavioral patterns) to create or modify one or more rules (e.g., via the one or more terms). Given that machine learning-based systems are set up to learn from collected data rather than require explicit programmed instructions, its ability to search for and recognize patterns that may be hidden within the collected data enable machine learning-based systems to uncover insights from collected data that allow for user preferences to be understood and rules to be created or modified. Advantageously, because machine learning-based systems use data to learn, it oftentimes takes an iterative approach to improve model prediction and accuracy as new data or preferences enter the animal data compliance system, as well as improvements to model prediction and accuracy derived from feedback provided from previous computations made by the animal data compliance system (which also enables production of reliable results). In such a scenario, new user preference data entering the animal data compliance system at any given time enables a new, deeper understanding of the user based upon a broader set of data. In a refinement, the creation or modification occurs automatically. In another refinement, the one or more rules may be created or modified for one or more users based upon one or more preferences of one or more other users. For example, the artificial intelligence-based system may be able to learn preferences of other users or observe characteristics of one or more other users, and based upon one or more shared characteristics or preferences with the targeted user, may be able to infer or deduce one or more preferences of the targeted user, thereby creating one or more rules or modifying one or more existing rules based upon the inferred or deduced one or more preferences.

In another variation, the one or more receiving computing devices create or modify one or more rules related to the animal data. For example, a user may request to update their permissions related to use of their animal data via computing device 20. The request can then be communicated to cloud server 41, which can act as the intermediary between receiving computing device 42 and the user via computing device 20. Cloud server 41 (e.g., which can be considered a receiving computing device in some variations) can then takes the user's request and create or modify the one or more rules. In another variation, creation or modification of the one or more rules are communicated to another one or more computing devices. This can include communication back to the computing device from which the animal data was sent, or from which the animal data originated (if different). In another variation, one or more rules are created or modified on one or more different computing devices from which the animal data is provided (e.g., sent, made available or accessible, and the like). For example, the animal data may be collected on a computing device 20 (e.g., a laptop computer) and sent to another computing device to be stored (e.g., cloud server 41). The rules for the animal data may be created on another computing device 20 (e.g., mobile phone), with the transaction for selling the data occurring on another computing device 20 (e.g., smartwatch) which then communicates with cloud 40 via one or more cloud servers 41 to provide the data to receiving computing device 42.

In another variation, the one or more rules are created or modified by the one or more computing devices (e.g., providing computing device, receiving computing device) based upon the animal data in order follow one or more schemas related to standardization and interoperability. One or more schemas can be created or modified in order for the animal data to be collected and transformed (e.g., normalized, timestamped, aggregated, cleaned, tagged, stored, processed, manipulated, denoised, enhanced, organized, visualized, anonymized, analyzed, synthesized, summarized, replicated, productized, synchronized, and the like) in a way that enables more scalable distribution to a plurality of computing devices (e.g., for consideration, which can be monetary or non-monetary in nature) and plurality of environments (e.g., real-world, virtual). Similar to FHIR standards in healthcare, custom schemas may be developed to enable interoperability of computing devices and animal data for acquisition, distribution, and/or use. In some variations, such interoperability is enabled to allow for the animal data to be distributed in exchange for consideration. The one or more rules related to standardization and interoperability can be associated with the animal data and provided as part of its distribution (e.g., attached as part of the metadata).

In another variation, one or more lines of executable code are embedded within at least a portion of the animal data. The one or more lines of executable code instruct (e.g., inform, notify, command) one or more computing devices to take one or more actions (e.g., enabling or preventing an action). The one or more lines of executable code can be in the form of a bot (e.g., software application, autonomous program) that is attached to the animal data that interacts with the one or more computing devices. In a refinement, the one or more actions related to the executable code including gathering information from the receiving computing device on which the animal data is located (e.g., resides) and communicating at least a portion of the gathered information to another one or more other computing devices (e.g., back to the collecting computing device, to another computing device). The gathered information includes at least one of: timestamp, IP address, location, device, type of browser (if a browser is involved), operating system, or service provider. The present invention is not limited to these specific types of information gathered, and other information may also be gathered (e.g., how the animal data is being used, where the animal data is being sent, lines of code associated with the use of the animal data). In another refinement, the gathered information enables the one or more computing devices to monitor, communicate, enforce, or a combination thereof, one or more terms related to consideration. One or more notifications can be created or modified based upon at least a portion of the gathered information (e.g., the one or more notifications can include one or more codes, graphs, charts, plots, colors or other visual representations, readings, numerical representations, descriptions, text, physical responses such as a vibration, auditory responses, visual responses, kinesthetic responses, or verbal descriptions, and the like). In another refinement, the one or more actions are created, modified, or taken automatically on the receiving computing device utilizing one or more artificial intelligence techniques based upon the one or more lines of executable code. The term "automatically" includes "autonomously" and vice versa. For example, the AI may be trained to identify certain uses or patterns of usage within the animal data and make a determination that the pattern related to use of the animal data is important enough to send back to the computing device from which the animal data was provided (or other computing device that is monitoring the usage). The frequency in which the information is gathered and sent to another one or more computing devices (e.g., in the form of one or more alerts and the like) can be a tunable parameter. It can be based on one or more parameters including time (e.g., time established by the user) and event (e.g., event-based such as an occurrence happening). In a variation, one or more artificial intelligence techniques may be utilized to define the frequency of the one or more notifications (e.g., alerts). In a refinement, the type of information collected can be tunable parameter.

Advantageously, the one or more lines of executable code can be embedded at the file level across all animal data (e.g., if a file contains a targeted individual's heart rate, blood pressure, and muscle activity data, then the code can be applied to all of a targeted individual's animal data—heart rate, blood pressure, and muscle activity data; the code can be applied to an entire group of targeted individuals' animal data such as a basketball team's heart rate data for each individual player) or subsets of the animal data within one or more files (e.g., targeted individual's heart rate data has different executable code than individual's blood pressure data within the same data file or dataset). In some cases, the one or more lines of executable code may be embedded at the value level (e.g., within targeted individual's heart rate data, each heart rate value may have one or more lines of executable code attached to it, which in some variations may be different for each heart rate value).

In many variations, the one or more lines of executable code are undetectable by the receiving computing device (e.g., akin to some forms of malware of computer virus). In similar variations, the one or more lines of executable code are unidentifiable by the receiving computing device. In a refinement, the one or more lines of executable code are included as part of the animal data (e.g., embedded, attached to) such that it moves along with the animal data as a unit.

In some variations, the one or more lines of executable code embedded within at least a portion of the animal data can be utilized in conjunction with one or more software programs that enable or prevent one or more actions (e.g., monitoring, reporting) related to use of the animal data. For example, in a sports betting or broadcast display of animal data such as an athlete's real-time fatigue data, the animal data compliance system and executable code can be operable to monitor one or more characteristics or features related to the terms of the animal data (e.g., length of time of data use, frequency of data use, where it has been distributed, how many other computing devices are accessing the information, how many bets are being placed utilizing the data), while being operable to take one or more actions related to the terms of use (e.g., if a sports betting platform has a license to use an athlete's fatigue data for 5 minutes for a given match and the sports betting platform exceeds the licensed time, the software program and one or more lines of executable code can control the use the data by preventing the sports betting platform from using the data or in some cases accessing the data). Information derived from the one or more actions taken by the one or more lines of executable code (e.g., tracking of animal data's use in a sports betting or broadcast application) can be communicated to one or more other computing devices (e.g., computing device of the user who is providing the animal data as part of a data license or other grant of rights with specified terms of use).

The animal data compliance system may also have one or more features including, or related to, a health monitoring or reporting (e.g., passport) system. In this case, for animal data the user chooses not to make available for sale or similar distribution, the user can still access, and provide access to, the data (e.g., the user does not want their ECG data to be distributed to third parties for consideration but wants their doctors to have access to their animal data). In a variation, for users that wish not to sell their data, the animal data compliance system can be operable to enable the user to define one or more terms related to their animal data to enable or prevent access (or place one or more permissions, restrictions, or conditions on the access) to their animal data by one or more third parties (e.g., while the user does not want their animal data for consideration, the user can define the one or more set of terms associated with access and use of their animal data by the sensor manufacturer collecting the data while also defining another one or more set of terms related to access and use of the animal data by their healthcare provider and their research partners, which may be different). Such a health monitoring or reporting system can be utilized in a wide variety of industries and for a variety of use cases including healthcare, home fitness, sports, pharmaceutical, elderly care, municipal, insurance, construction, employee wellness, logistics, virtual environments, and the like. Advantageously, access to the animal data may occur in real-time or near real-time. In a variation, the animal data compliance system can enable a user to define one or more terms related to intra-system access (e.g., the user does not want their ECG data to be distributed to third party computing devices for consideration but wants their ECG data to be distributed to, or accessible by, their medical doctor or fitness instructor via the same system). In a refinement, the health monitoring or reporting system includes the use of one or more sensors $18^l$. In another refinement, the health monitoring or reporting system includes one or more hardware transmission subsystems. In another refinement, the health monitoring or reporting system utilizes one or more artificial intelligence techniques to generate at least one insight or predictive indicator. Advantageously, such a system can also be utilized in virtual environments (e.g., the metaverse) that utilize real-world animal data and/or simulated data based upon at least a portion of real-world animal data (e.g., with one or more rules attached to the simulated data based upon one or more terms created or modified for the simulated data).

In some variations, an animal data compliance system can be implemented utilizing a variety of data licensing models. For example, a user may provide the one or more terms related of their animal data which are communicated—along with the animal data—to a central server (e.g., cloud server 41, intermediary server 22). This central server may be tied to a software program (e.g., application) operating on the receiving computing device. The receiving computing device may receive a license that defines the terms of use related to the animal data via the one or more rules established by the user. Combined with the central server, the software program may act as "check point" that enables or prevents one or more uses of the data via the one or more rules created by the user and the license acquired by the receiving computing device. For example, a data acquirer utilizing the receiving computing device may be prevented from taking an action with the animal data (e.g., sending the data to another computing device) based upon the license established by the data acquirer and the user based upon the user's terms (e.g., permissions, restrictions, conditions, other rights) related to their animal data. In a variation, the central server may prevent data from being accessed or used based on the license. In another variation, the user may change or update their terms (e.g., permissions, restrictions, conditions, or other rights) on a computing device (e.g., computing device which then gets sent to the central server and updated for future use. In another variation, the central server may only allow for access to the animal data when the receiving computing device is in communication with the network. This may prevent unauthorized use of the data offline.

In another variation, the animal data compliance system can be part of an operating system. The operating system may contain its own applications, background processors, and the like to take one or more actions related to the one or more terms established by the user (e.g., data owner) related to use of their animal data. Such actions (e.g., enforcement of the license, monitoring of the use of the data, and the like) can be implemented across multiple computing devices that are utilizing the operating system and corresponding applications.

In a refinement, the license to acquire, distribute, and/or use animal data can be updated by the user. Depending on the type of license, the user can update the one or more terms related to use of their data on a computing device which can then be provided (e.g., sent, made available) to one or more computing devices (e.g., the receiving computing device, a computing device in communication with the centralized server which then notifies the receiving computing device). In another refinement, two or more licenses may exist for the same animal data. For example, the user may create different licenses for different data acquirers utilizing the same animal data. Advantageously, this means that the same animal data can be acquired or distributed (e.g., sold) multiple times.

In another refinement, one or more actions taken by the one or more receiving computing systems may invalidate the license related to use of the animal data, at least in part. For example, removing or manipulating one or more lines of executable code associated with the animal data may invalidate the license, at least in part. In another example, use of the animal data in an unauthorized manner (e.g., not in compliance with the license) may invalidate the license, at least in part. An invalidated license can prevent authorized use of the animal data and prevent the previously-licensed computing device from utilizing the animal data legally.

In another refinement, a central server can create a network of computing devices that prevents unauthorized animal data from being acquired, distributed, and/or used (e.g., sold) within the network. For example, in the event a user wants to sell their animal data, the network of computing devices can restrict the acquisition of such data within the network (e.g., a co-op of computing devices that agree to abide by one or more agreed upon terms). The network may agree to check with the central server each time data is used for any given use case so that the central server can check the data and metadata to ensure it has been acquired under a valid license and is being used under the terms of the license agreement. The central server's ability to monitor data usage in light of the associated metadata which includes the one or more terms allows for the central server to identify data that is not being used in accordance with its agreement (e.g., license). If the central server identifies animal data that is in breach of the one or more licenses, it can highlight and/or mark the data (e.g., mark the data as invalid, stolen, in breach of the licensing agreement, and the like) so that other computing devices in the co-op agree not to acquire it. In a variation, the central server may only distribute animal data to receiving computing devices that agree to abide by the one or more standards and terms established with its use (e.g., computing devices that are certified).

In another refinement, the animal data compliance system operates utilizing distributed ledger technology such as a blockchain-based system or an IOTA Tangle-based system, or other ledger system or method. Note that many variations of distributed ledger technologies can be used, and this invention is not limited to any particular type of distributed ledger technology used.

In a refinement, a user can create or modify one or more terms related to the use of their animal data in a video game or simulation (e.g., virtual environment including the metaverse). This includes derivatives of animal data, including simulated data that may be generated by the video game or simulator based upon the real-world animal data. For example, the game or simulation may incorporate an individual's real-world health data as part of virtual environment. In this example, the user may provide one or more terms related to the use of their animal data to the video game or simulation operator (e.g., virtual environment operator) related to its acquisition and use. In another example, the user may provide the same or different terms related to the acquisition and use of their animal data to one or more other individuals that are part of the video game or simulation (e.g., other participants in the metaverse who may be interested in acquiring the simulated animal data that is generated based upon the real-world animal data). In another refinement, one or more terms for one or more types of real-world animal data may be the same for, or different from, the one or more terms associated with the same type of simulated animal data (e.g., the same terms or different terms created for a user's real-world heart rate data and their simulated heart rate data).

In a refinement, the animal data compliance system can automatically generate one or more agreements (e.g., licenses, contracts, smart contracts) between a user and one or more data acquirers related to the acquisition of the user's animal data. The agreement can include the one or more terms (e.g., rights, permissions, restrictions, conditions, and the like) related to the authorized use of the animal data established by the user. Based upon one or more terms associated with the animal data (e.g., via the one or more terms selected by the user), the animal data compliance system can automatically generate the one or more agreements that the user and acquirer can execute (e.g., via a selection mechanism such as selecting a box to check, verbal authentication, digital signature, manual signature, system-to-system certification, and the like) to enable the acquirer to access and use the animal data based upon the agreed-upon terms. Such agreements, in whole or in part, may be in one or more formats that are machine (e.g., computing device)-readable only, readable by humans, or readable by both. In many variations, the acquisition of data will be in exchange for consideration. Conversely, the animal data compliance system may automatically generate the one or more agreements that the user and acquirer can execute based upon the data acquirer selecting one or more terms that are associated with the animal data (e.g., in one example, the data acquirer establishes the one or more terms related to the use of the animal data, from which one or more agreements are generated. In another example, the user has established the permissions, restrictions, and conditions related to use of the animal data. Based upon this, the animal data compliance system enables the data acquirer to select the one or more terms associated with the data acquirer's use of the animal data based upon the one or more permissions, restrictions, and conditions established by the user. Once the one or more selections occur, one or more agreements can be generated and executed by the user and data acquirer). In some variations, the animal data compliance system may automatically generate the one or more agreements that the user and acquirer can execute based upon both the user and data acquirer selecting one or more terms that are associated with the animal data. In a refinement, the animal data compliance system may automatically generate the one or more agreements that the user and acquirer can execute based upon previously established preferences of the user, data acquirer, or a combination thereof. The animal data compliance system may utilize one or more artificial intelligence techniques to identify the one or more preferences. In a refinement, the computing device of the user and computing device of the acquirer execute the one or more agreements on behalf of the user and acquirer via a digital handshake or other agreement-based mechanism. In another refinement, the one or more agreements are included as part of the one or more certificates.

In a variation, one or more agreements are automatically generated based upon the one or more rules associated with the animal data. In some variations, the one or more agreements may be generated and executed before the one or more rules are created or modified. In other variations, the one or more agreements may be generated and executed after the one or more rules are created or modified but before animal data is provided to the acquirer. In other variations, the animal data and the one or more rules may be provided to the acquirer prior to execution of the one or more agreements (e.g., the animal data may be encrypted until the agreements are executed, upon which one or more encryption keys are provided). In a refinement, the one or more agreements include one or more terms related to the animal data from one or more previous agreements. In another refinement, the one or more terms are automatically generated and included as part of the one or more agreements. In another refinement, the one or more agreements are created or modified (e.g., updated, nullified) based upon one or more new agreements gathered or created by the animal data compliance system.

Characteristically, a user can provide the same animal data set (e.g., heart rate data for a defined period of time), or the same type of animal data (e.g., all heart rate data), for a variety of use cases to a plurality of third-party acquirers, including future third-party acquirers that may be subsequent to current third-party acquirers for the same animal data set or same type of animal data. In this regard, the user can establish one or more agreements with each individual data acquirer that establish terms related to the acquired animal data. In some cases, the one or more rights granted to each data acquirer may conflict with each other. In order to maintain that rights related to acquired animal data and granted to future data acquirers do not infringe upon rights already granted to previous (e.g., existing) acquirers for the same animal data or same type of animal data, the animal data compliance system can automatically generate one or more new animal data acquisition agreements between the user and future data acquirers that include one or more terms from one or more previously executed agreements that contemplate the same animal data or same type of animal data with permissions, restrictions, or conditions attached to it based upon the one or more previously executed agreements. The one or more terms can provide one or more restrictions or enablements to a future data acquirer. More specifically, in some variations the animal data compliance system can automatically generate one or more agreements with one or more terms and conditions already included from previous agreements that contemplate rights already granted and/or excluded (meaning the one or more agreements include or exclude language based upon rights already granted to previous acquirers and not able to be granted to future acquirers for a period of time) while enabling one or more new fields within the agreement to be populated by the user and/or acquirer, or automatically generated by the animal data compliance system, in order to complete the agreement (e.g., via questionnaire, via manual input, via automatic fill-in based upon one or more selections made by the user and/or the acquirer, and the like). Such terms from previous agreements may be first provided to the user and/or acquirer via one or more notifications (e.g., alerts) that outline the one or more material terms (e.g., permissions, restrictions, conditions) related to the animal data in a summarized format (e.g., in which the animal data compliance system may receive some form of consent or signoff from the user and/or the acquirer). Similarly, new terms may be first provided to the user and/or acquirer via one or more notifications (e.g., alerts) that outline the material terms related to the acquisition, distribution or use of animal data in a summarized format (e.g., in which the animal data compliance system may receive some form of consent or approval from the user and/or the acquirer prior to the agreement being generated).

In a variation, and in addition to terms provided by the user that are incorporated into an agreement between a user and a data acquirer, the animal data compliance system can also provide the one or more terms that bind the user (e.g., restricts the user) based upon one or more previous agreements executed by the user or rights holder, if different, of the animal data (e.g., animal data can have multiple owners and multiple agreements associated with the same animal data, one or more terms of which may overlap depending on the agreement). In this regard, the animal data derived from a user may not only have an owner or multiple owners, but also a hierarchy that the one or more users and subsequent acquirers are bound to. For example, a user may enter into an agreement to provide their animal data to a data acquirer for consideration. Such data may have one or more terms associated with that data via one or more previous agreements with previous data acquirers. The animal data compliance system may be operable to automatically generate, at least in part, one or more agreements based upon the one or more terms which bind the user and the data acquirer (e.g., a contract for acquisition of health data and terms associated with its use). A user may then enter into another one or more agreements to provide their animal data to another one or more data acquirers for consideration. Characteristically, the animal data compliance system may be operable to automatically generate, at least in part, one or more agreements that incorporate one or more relevant terms associated with the contemplated animal data from any one or more previous agreements into the one or more new agreements in order to ensure that previously agreed-upon terms have been contemplated in future agreements (e.g., to ensure the user is granting rights that are not in breach of any other agreements). In this regard, an electronic record (e.g., digital record) for the animal data can be created or modified, the digital record including the one or more rules associated with the animal data. The digital record can include a chain of ownership that is created or modified based upon one or more ownerships or one or more periods of ownership. In a variation, the digital record can include the one or more terms established by the user for the animal data. In another variation, the digital record can also be the reference upon which one or more rights can be granted. For example, in the event a user selects one or more preferences related to the distribution of animal data to a data acquirer, the animal data compliance system may check the one or more preferences against the digital record of the animal data to ensure that the user is able to distribute the animal data with the desired terms attached. In some variations, the digital record can also include information such as consideration associated with the animal data (e.g., the cost to acquire the animal data, the consideration received for any given animal data, and the like), as well as any terms (e.g., preferences) not included as part of the one or more rules. The digital record may be stored locally or on another one or more computing devices (e.g., one or more cloud servers). In a refinement, two or more animal data acquirers with rights to the same animal data are combined into the same digital record. In another refinement, the chain of ownership that includes multiple owners of the same animal data originates, and is operable to be tracked, from a single user, a single animal data set, or a single type of animal data.

In a variation, the animal data compliance system can track multiple owners of data from a single user, a single animal data set, or a single type of animal data, and can combine two or more ownerships of the same data into a single digital record. The animal data compliance system can also incorporate multiple ownerships and multiple periods of ownership by creating a chain of ownership for any given animal data. In a refinement, animal data that has been distributed for consideration (e.g., sold) can have multiple owners at the same time. Characteristically, the animal data compliance system can create a chain of ownership whereby there can be multiple owners at any given time and track the terms associated with each of the one or more ownerships. The rights associated with the one or more owners in the chain of ownership can be added, removed, modified, or replaced. Additionally, one or more owners in the chain of ownership can be added, removed, modified, or replaced. In some variations, chain of ownership and recordkeeping may utilize technologies such as distributed ledger technology or other ledger system or method (e.g., including centralized ledger systems or methods).

In a refinement, at least a portion of the animal data may be in a tokenized format. In some variations, it may be represented, distributed, acquired, and/or sold in the form of one or more non-fungible tokens (NFTs), which are one or more representations of the animal data in a tokenized format. The token has metadata that provides the information related to the animal data that verifies one or more parameters related to the authenticity of the animal data and the one or more rights (e.g., ownership, license with one or more terms associated) associated with the animal data (e.g., via the digital record). Characteristically, each type of animal data associated with each user, each animal data set within each type of animal data, each animal data value within each data set, and the like can be individually or collectively represented by one or more NFTs. In a variation, animal data in the form of one or more NFTs has associated metadata (e.g., attached metadata) that include one or more rules related to the acquisition, distribution, and/or use of the NFT-represented animal data. The metadata may also include one or more digital records related to the animal data (e.g., including chain of ownership information). In another variation, one or more digital records associated with the animal data may include information related to the acquisition or distribution of one or more NFTs that represent at least a portion of the animal data (e.g., information related to one or more transactions for the sale of NFTs that incorporate at least a portion of the animal data).

Advantageously, the one or more rules created for each animal data-based NFT, or group of animal data-based NFTs, may create unique value for each of the animal data-based NFTs (or group of NFTs). For example, there may be multiple NFTs featuring the same animal data with one or more different rules, such that one NFT may have a set of rules associated based on one or more terms (e.g., set by the one or more previous owners or users) that make the NFT more valuable than another NFT featuring the same animal data with another set of one or more rules (e.g., set by the one or more previous owners or users) that are more restrictive in their distribution or use. In a refinement, the uniqueness of the NFT (and therefore the value derived from it) may be derived from animal data, the one or more rights associated with the animal data, or a combination thereof. Therefore, a user can create multiple NFTs featuring the same animal data but with one or more different terms attached (i.e., providing one or more different rules related to its acquisition, distribution, and/or use). The one or more different terms can create unique value for each NFT and enable the user to distribute (e.g., sell) the same animal data value(s), type(s), or set(s) multiple times. In another refinement, ancillary data may be represented, distributed, acquired, and/or sold in the form of one or more NFTs.

In some variations, the initial data acquirer may have rights to further distribute (e.g., sell) the animal data to subsequent data acquirers. In this example, and depending on the agreement, the terms associated with the agreement between the initial data acquirer and subsequent data acquirers may be gathered by the animal data compliance system and included as part of the one or more restrictions placed upon the user and/or incorporated into the future one or more agreements.

In a refinement, a previously-executed agreement between a user and data acquirer is changed or modified (e.g., updated, nullified) based upon one or more new agreements entering the animal data compliance system. For example, if a user leaves his employer—who may have rights to their animal data—and signs a new agreement with a new employer—who may have updated rights to their animal data which has nullified the agreement with the previous employer, the animal data compliance system may change or modify the existing ownership "hierarchy" of their data in the one or more digital records and remove rights associated with their previous employer while associating new rights with the new employer.

In another refinement, a user is prevented by the animal data compliance system from taking one or more actions (e.g., selecting one or more preferences, providing consent for an animal data distribution, executing one or more agreements, and the like) based upon one or more previous agreements.

In another refinement, once the user and the data acquirer agree to the terms, execute an agreement, and the computing device provides the animal data with the one or more rules to a receiving computing device, the animal data may include one or more lines of executable code that prompt a compliance agreement prior to one or more subjects or receiving computing devices accessing the animal data on the data acquirer side. The compliance agreement may be in the form of alert or notification whereby the one or more subjects or receiving computing devices are required to take one or more actions (e.g., check a box that provides the terms and conditions that they agree to abide by; digitally sign an agreement) prior to gaining access to the data. The one or more actions taken on the receiving computing device are then reported back to the animal data compliance system in order for the animal data compliance system to monitor one or more parameters related to usage of the animal data (e.g., who is accessing the animal data, what computing devices are accessing it, where is it being accessed, how is it being accessed, and the like) and compliance related to the associated terms.

Figure 2:
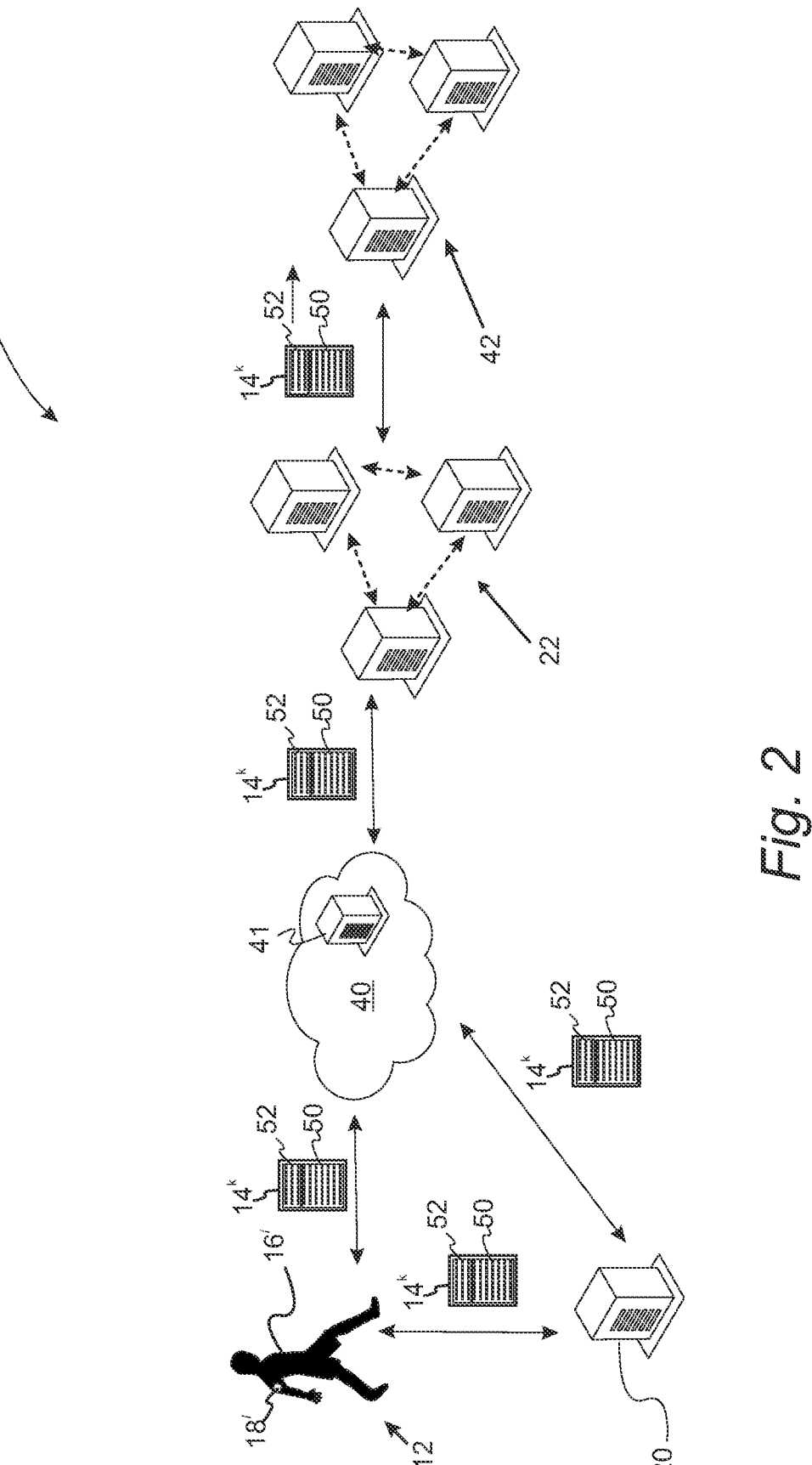
FIG. 2 provides a schematic illustration of an animal data compliance system that enables compliance related to the collection, use, and distribution of animal data.

Referring to FIG. 2, an animal data compliance system and implemented method is schematically illustrated. FIG. 2 provides a schematic for the animal data compliance system and related method. Animal data compliance system $10^l$ is recognized as an example of the animal data compliance system of FIG. 1 described above which can be used in general to practice the presently described method. Animal data compliance system $10^l$ includes one or more sources of animal data $14^k$ from one or more targeted individuals $16^i$, where i and k are integer labels as described above. The animal data is transmitted electronically. In a refinement, one or more sources of animal data $14^k$ are sensors $18^l$ as set forth herein. A collecting computing device (e.g., computing device 20 or intermediary server 22) gathers (i.e., receives or collects) the animal data. In this regard, the collecting computing device can be computing device 20 and/or intermediary server 22. In a refinement, computing device 20 is local to the targeted individual $16^i$. In this context, local means that the sensors are wired to computing device or sufficiently close to receive a signal from the sensors via WiFi or a other wireless technology such as Bluetooth, Bluetooth Low Energy (BLE), ZigBee, cellular-based technology, LoRa, ultra-wideband, Ant+, and the like. Typically, in this refinement, the targeted individual $16^i$ is within 1000 yards of computing device 20. Computing device 20 can then transmit animal data $14^k$ (e.g., over cloud 40 via one or more cloud servers 41) to intermediary server 22 or another computing device. In another refinement, one or more sources of animal data $14^k$ can directly transmit animal data $14^k$ (e.g., over cloud 40 via one or more cloud servers 41) to intermediary server 22 or another computing device. One or more rules 50 related to at least a portion of the animal data are created or modified (e.g., based upon one or more terms). One or more lines of executable code 52 based upon the one or more rules are created or modified and embedded within at least a portion of the animal data. At least a portion of animal data and the executable code are provided to one or more receiving computing devices 42. The one or more lines of executable code 50 instruct the one or more receiving computing devices to take (e.g., perform) one or more actions consistent with the permissions encapsulated by the one or more rules.

In a refinement, the one or more actions includes gathering information from the computing device on which the animal data is located and communicating at least a portion of the gathered information to another one or more other computing devices. In a further refinement, the gathered information includes at least one of: timestamp, IP address, location, device, type of browser (if a browser is involved), operating system, or service provider. The present invention is not limited to these specific types of information gathered, and other information may also be gathered (e.g., how the animal data is being used, where the animal data is being sent, lines of code associated with the use of the animal data). One or more notifications can be created or modified based upon at least a portion of the gathered information (e.g., the one or more notifications can include one or more codes, graphs, charts, plots, colors or other visual representations, readings, numerical representations, descriptions, text, physical responses such as a vibration, auditory responses, visual responses, kinesthetic responses, or verbal descriptions, and the like). In another refinement, the gathered information enables the one or more computing devices to monitor, communicate (e.g., alert), enforce, or a combination thereof one or more terms related to the acquisition, distribution, or use of the animal data in exchange for consideration. The one or more actions can be created, modified, or taken automatically utilizing one or more artificial intelligence techniques based upon the one or more lines of executable code. In another refinement, the one or more actions enable the computing device to, or prevent the computing device from, taking an action related to the animal data. In another refinement, the at least a portion of the animal data and the one or more lines of executable code are provided to one or receiving more computing devices in exchange for consideration.

Figure 3:
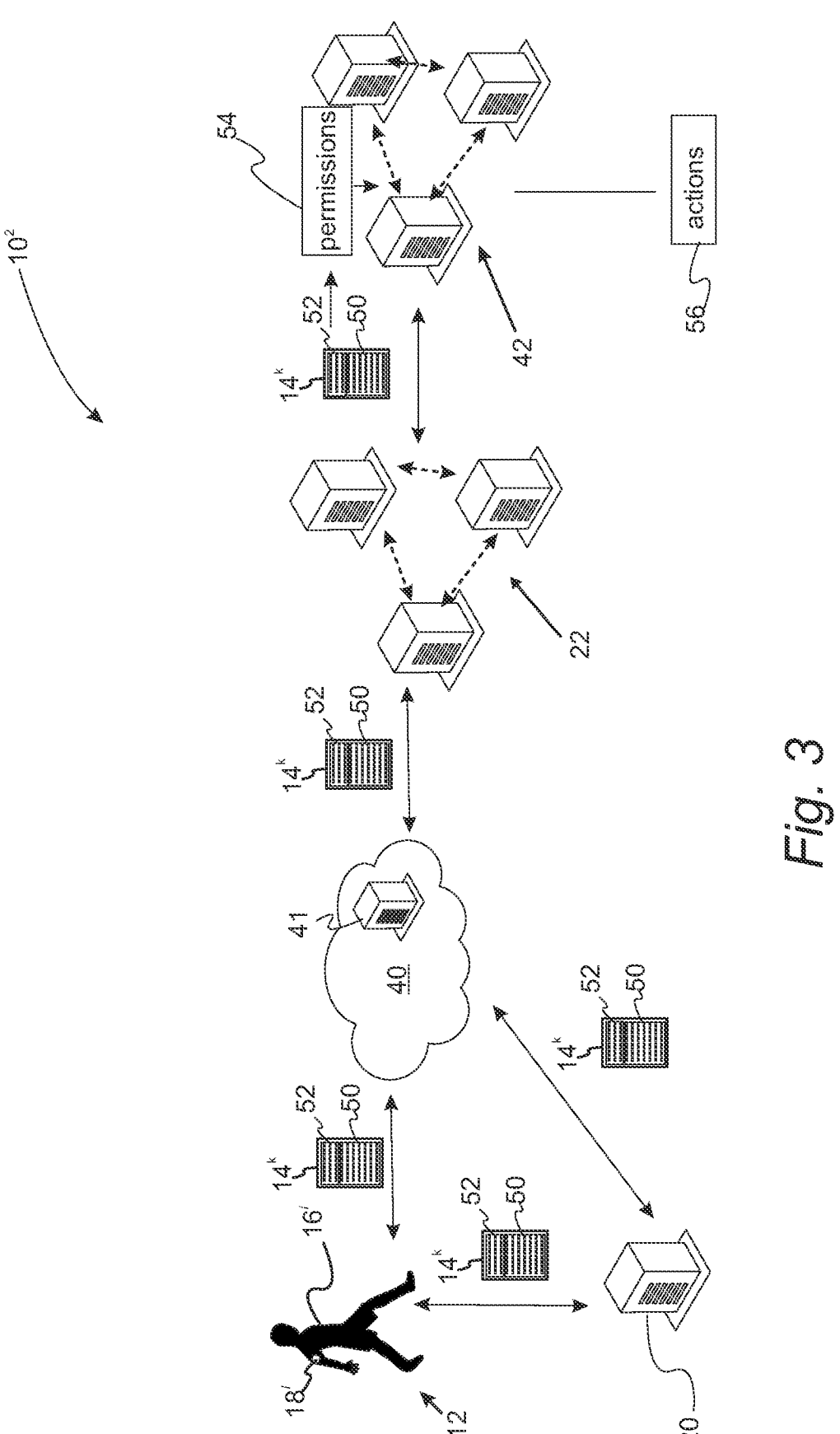
FIG. 3 provides a schematic illustration of an animal data compliance system that enables compliance related to the collection, use, and distribution of animal data.

Referring to FIG. 3, an animal data compliance system and method is schematically illustrated. Animal data compliance system 10$^2$ includes a collecting computing device and a receiving computing device. The animal data compliance system 10$^2$ also includes one or more source sensors that gather animal data 14$^k$ from one or more targeted subjects. The method includes a step of transmitting electronically one or more sources of animal data 14$^k$ from one or more targeted individuals 16$^i$. Integer labels l, i, and k are the same as set forth above. The collecting computing device (e.g., computing device 20 or intermediary server 22) gathers (i.e., receives or collects) the animal data. In this regard, the collecting computing device can be computing device 20 and/or intermediary server 22. In a refinement, computing device 20 is local to the targeted individual 16$^i$. In this context, local means that the sensors are wired to computing device or sufficiently close to receive a signal from the sensors via WiFi or a other wireless technology such as Bluetooth, Bluetooth Low Energy (BLE), ZigBee, cellular-based technology, LoRa, ultra-wideband, Ant+, and the like. Typically, in this refinement, the targeted individual 16$^i$ is within 1000 yards of computing device 20. Computing device 20 can then transmit animal data 14$^k$ (e.g., over cloud 40 via one or more cloud servers 41) to intermediary server 22 or another computing device. In another refinement, one or more sources of animal data 14$^k$ can directly transmit animal data 14$^k$ (e.g., over cloud 40 via one or more cloud servers 41) to intermediary server 22 or another computing device. One or more rules 50 related to at least a portion of the animal data (e.g., based upon one or more terms) are created for modified. The one or more rules 50 are associated with the at least a portion of animal data. At least a portion of animal data 14$^k$ and the associated one or more rules 50 are provided to one or more receiving computing devices 42. The one or more receiving computing devices 42 are informed of one or more permissions, restrictions, or conditions related to the at least a portion of animal data which are contained in the one or more rules. One or more receiving computing devices 42 perform at least one action 56 based upon the one or more rules.

In a refinement, the one or more rules are created or modified based upon one or more terms provided either directly or indirectly by the user. In a variation, the animal data and the one or more rules are provided to the to one or more receiving computing devices for consideration (e.g., in exchange for consideration), or as part of one or more transactions in exchange for consideration. In another refinement, the one or more rules are created or modified by the rights holder (e.g., data owner) for animal data not yet collected or gathered from the targeted individual (e.g., future animal data). In another refinement, one or more artificial intelligence techniques are utilized to create or modify the one or more instructions. In another refinement, one or more artificial intelligence techniques are utilized to create or modify the one or more rules. In another refinement, the method operates, at least in part, utilizing distributed ledger technology or other ledger method/system.

Figure 4:
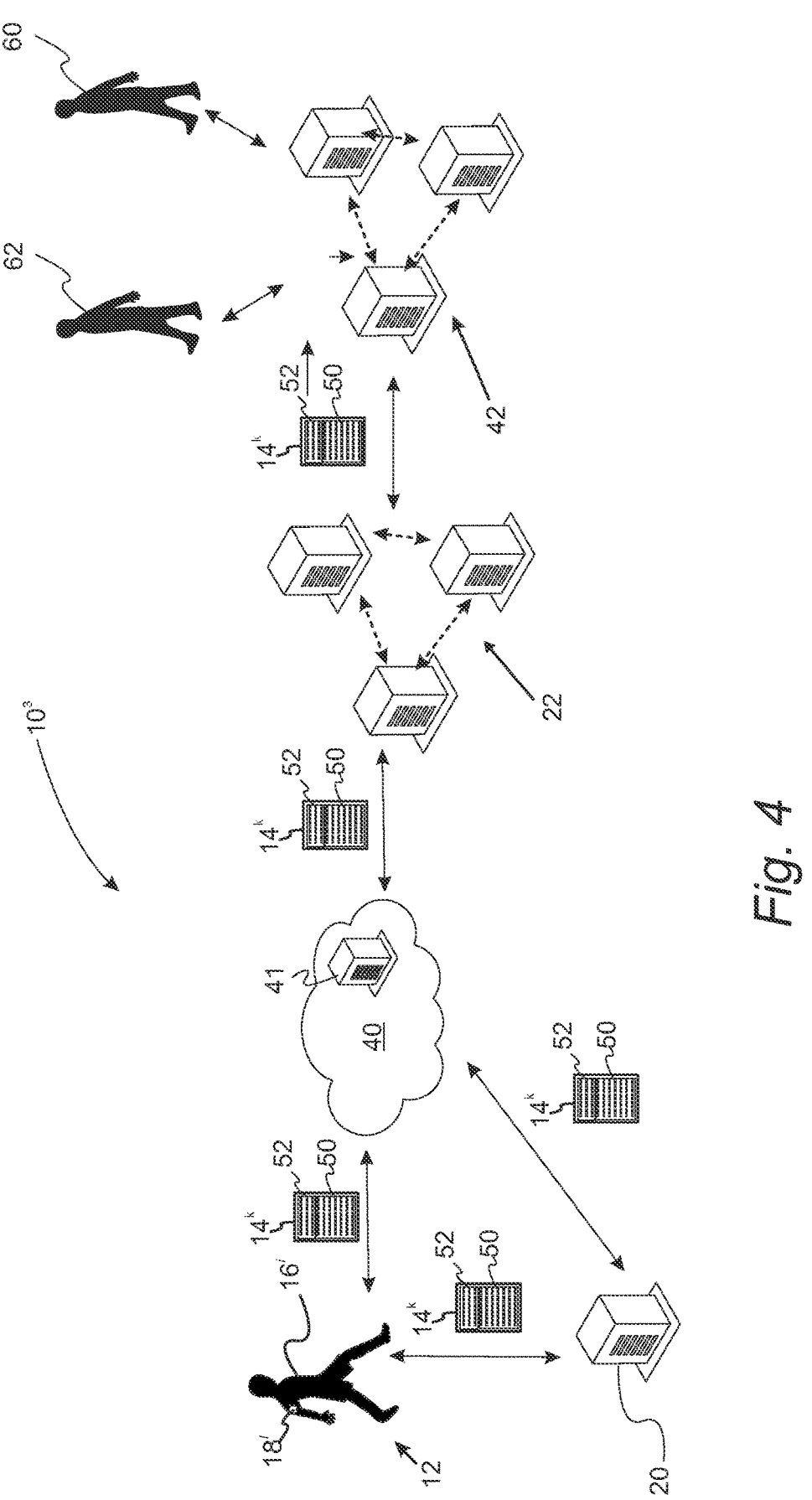
FIG. 4 provides a schematic illustration of an animal data compliance system that enables compliance related to the collection, use, and distribution of animal data.

Referring to FIG. 4, an animal data compliance system and method is schematically illustrated. The animal data compliance system 10$^3$ includes one or more source sensors 18$^i$ that gather animal data 14$^k$ from one or more targeted subjects (e.g., targeted users). Characteristically, the animal data is transmitted electronically (e.g., wirelessly or with a wired connection). A collecting computing device (e.g., computing device 20 or intermediary server 22) gathers the animal data 14$^k$. Integer labels l, i, and k are the same as set forth above. In this regard, the collecting computing device can be computing device 20 and/or intermediary server 22. In a refinement, computing device 20 is local to the targeted individual 16$^i$. In this context, local means that the sensors are wired to computing device or sufficiently close to receive a signal from the sensors via WiFi or a other wireless technology such as Bluetooth, Bluetooth Low Energy (BLE), ZigBee, cellular-based technology, LoRa, ultra-wideband, Ant+, and the like. Typically, in this refinement, the targeted individual 16$^i$ is within 1000 yards of computing device 20. Computing device 20 can then transmit animal data 14$^k$ (e.g., over cloud via one or more cloud servers 41) to intermediary server 22 or another computing device. In another refinement, one or more sources of animal data 14$^k$ can directly transmit animal data 14$^k$ (e.g., over cloud 40 via one or more cloud servers 41) to intermediary server 22 or another computing device. One or more terms related to the animal data 14$^k$ are defined by the one or more users 60 (e.g., which may also be targeted subject 18), one or more data acquirers 62, one or more computing programs, or a combination thereof, via one or more computing devices 42 to enable, prevent, or determine one or more uses or actions related to the animal data. One or more digital records associated either directly or indirectly with the animal data, animal data rights holder (e.g., animal data owner, licensee, or the like), animal data acquirer, or a combination thereof, are created or modified (e.g., enhanced, added to, updated) by one or more users, by the animal data compliance system (e.g., automatically), or a combination thereof based upon the one or more terms. The one or more digital records are operable to prevent one or more rules from being created or enable one or more rules to be created based upon rights to (e.g., ownership of, license to) the animal data $14^k$, one or more other terms associated with the animal data $14^k$ (e.g., other preferences), or a combination thereof. One or more rules 50 related to the animal data are created or modified based upon, at least in part, information gathered from the one or more terms and the one or more digital records, wherein the one or more rules are associated with (e.g., attached to, included as metadata with) the animal data. At least a portion of the animal data $14^k$ and the one or more rules 50 are distributed by the one or more computing devices to one or more receiving computing devices, wherein the same portion of animal data $14^k$ is distributed at least one of: (1) over multiple periods of time, (2) across multiple transactions, (3) to multiple parties, (4) to multiple computing devices, or (5) a combination thereof. In a refinement, at least one of the one or more distributions occurs in exchange for consideration. The one or more digital records are modified based upon the one or more terms or rules associated with the one or more distributions or uses (e.g., the one or more terms or rules associated with the one or more distributions are added to—or modify—the digital record). In a refinement, the same one or more terms can be added to or modify multiple digital records. In another refinement, the animal data compliance system operates, at least in part, utilizing distributed ledger technology or other ledger method/system. In another refinement, the animal data compliance system utilizes one or more artificial intelligence techniques to create or modify (e.g., including remove/delete) the one or more digital records. In another refinement, the one or more digital records are operable to prevent one or more terms from being selected, or enable one or more terms to be selected. In another refinement, a digital record includes a plurality of digital records.

In a variation, the same portion of animal data may be re-distributed (e.g., re-sold) multiple times. For example, an individual's heart rate data for a defined period prior to having a medical episode may be distributed to multiple third parties, one or more of which may be for consideration. The animal data compliance system can enable each distribution to have a different set of terms associated with the animal data for each individual distribution, enabling different rules to be created for the same animal data that can be distributed to the appropriate third-party acquirers. The one or more terms for each transaction can then be added to the digital record for the animal data. In some variations, the digital record may be for the user, the animal data, the data acquirer, or a combination thereof. Characteristically, the digital record can prevent terms from being selected (or enable terms to be selected) as well as prevent rules from being generated (or enable rules to be generated). With new distributions of animal data, the digital record updates to ensure that future uses of the animal data do not infringe on rights already granted to existing data owners/licensees.

In a refinement, information related to the one or more distributions of the animal data are added to the one or more digital records. In another refinement, information related to the one or more uses of the animal data by one or more receiving computing devices based upon the one or more distributions are added to the one or more digital records.

In a variation, the system may be operable to enable one or terms to be modified (e.g., price adjusted) for existing data acquirers, with one or more modified rules being provided to the one or more data acquirers. For example, in the event a targeted subject experiences a medical episode, the value of their animal data before, during, and/or after the medical episode may increase, enabling the user to increase the price of the animal data for both existing animal data users (e.g., in the event consideration is being paid monthly for access to their animal data) and new acquirers.

The animal data compliance system can be implemented in the context of deceased or incapacitated individuals and their previously collected animal data. The animal data from the one or more deceased or incapacitated individuals can be considered an asset (e.g., monetizable asset) transferrable to one or more heirs or assignees with value that extends beyond the life of the individual. In such cases, the individual's one or more heirs or assignees can derive value from the deceased or incapacitated individual's animal data, which may be periodic or continuous, and may be previously collected, currently collected, or both, based upon its distribution to one or more third parties. In some cases, the one or more deceased or incapacitated individuals may select one or more terms to be associated with their animal which may be temporarily or permanently associated with their animal data (e.g., via the digital record). In other cases, the one or more terms may be changed or modified by the one or more other users (e.g., heirs, assignees, or other individuals) empowered with the capacity to make the one or more changes or modifications (e.g., after one or more occurrences or milestones such as after a certain period of time, after a certain revenue threshold has been achieved, or after another milestone). For example, the deceased individual may have applied one or more terms to their animal data (e.g., a value for a one or more specified types of animal data collected during a specified period of time), which may be differ based upon the data acquirer and use case, such as the individual donating their animal data to non-profit cancer research organizations for no consideration but charging a monetary fee for their animal data to health analytics companies interested in analyzing the individual's data after the death of the individual. In some scenarios, the one or more terms may change after the individual is incapacitated or dies as the nature in which they died or are incapacitated may significantly increase the value of their data, in which case the one or more heirs or assignees can modify the one or more terms (e.g., the individual who has collected animal data using sensors has a heart attack, at which point their data leading up to the heart attack and at the point of heart attack becomes extremely valuable to third-party research organizations). In a refinement, the animal data compliance system automatically creates or modifies the one or more terms based upon one or more variables (e.g., the context in which the person dies or is incapacitated may cause the value of the animal data to increase). In a variation, the animal data compliance system utilizes one or more artificial intelligence techniques to create or modify the one or more terms based upon the one or more variables. In another refinement, one or more terms may be automatically created or modified by the animal data compliance system based upon one or more user preferences and/or characteristics (e.g., including user attributes). In a variation, the animal data compliance system utilizes one or more artificial intelligence techniques to create or modify the one or more terms based upon the one or more user preferences and/or characteristics.

The one or more terms may include at least a portion of the animal data being assigned to one or more groups based upon one or more preferences or characteristics (e.g., conditions, attributes) related to the individual (e.g., a group of deceased individuals that all died from a heart attack with specific characteristics such as same age, weight, height, and medical conditions, as examples, may have significantly more value if sold together than if sold individually). As examples, groupings may include by sensor type, data type, one or more sensor operating parameters, placement of sensor, activity, environmental condition, bodily condition, context, duration of data collection period, quality of data, size/volume of the data set, analytics applied to the animal data, data value, other value indicators, monetary considerations, non-monetary considerations (e.g., how much effort and time it took to create or acquire the data), characteristics of the one or more targeted individuals, source computing device of the animal data, and the like. In a refinement, the animal data compliance system provides a feature to automatically assign one or more individuals to one or more groups based upon the animal data compliance system making a determination that the individuals' data would be sold for more as part of the group rather than on its own. Such one or more determinations may be made using one or more artificial intelligence-based techniques.

From a health insurance standpoint, using one or more sensors to collect animal data leading up to an individual's incapacitation or death and the individual providing one or more terms related to the acquisition, distribution, or use of their animal data (e.g., determining available animal data, associated attributes of that data, allowable use, and the like) and enabling the insurance company to have access to the data for future use may enable the individual or their heirs/assignees/other rights holders to receive consideration (e.g., reduced premium costs, receive money) from one or more insurance or insurance-related parties. For example, multiple insurance companies may want animal data from an individual with stage 4 cancer, and the individual may enable the acquisition of their animal data by multiple insurance companies in exchange for consideration based upon one or more terms established by the data owner. In some variations, the data owner may be able to change the one or more terms established for their data posthumously by establishing the one or more conditions upon which the one or more terms change. For example, an individual may want to change the price of their animal data after a specific monetary threshold is reached, or enable the animal data compliance system to automatically change the value of the data based upon the market price (or price that the data can be sold for as determined by the animal data compliance system). In a variation, the data acquirer (e.g., insurance company) may establish the one or more terms based on preferences of the data acquirer, which can be accepted, rejected, or modified by the user.

In some cases, the one or more rules can be used as part of artificially creating or replicating a human (e.g., hologram, virtual environments) or behavior of a human (e.g., speech). For example, in the event a third party provides technology to artificially bring deceased or incapacitated humans back to "life" to enable one or more individuals to virtually interact with a deceased or incapacitated user, the one or more rules established by the user prior to their death can determine how their animal data can be used. The rules can then be associated with their data for as long as the animal data is available, or for a period of time defined by the deceased or incapacitated user (or their heirs/assignees if applicable) prior to their death or incapacitation.

In some variations, one or more organs may be donated by a donor individual to a recipient individual. In this case, when the one or more organs are donated, the donor individual or their heirs, assignees, or legal representative may include one or more terms that enable the donor to receive consideration from any consideration-based transaction related to the distribution of animal data derived from the one or more donated organs (e.g., or consideration derived from other animal data that is directly or indirectly impacted by the one or more donated organs). For example, if a donor individual donates their heart to a recipient individual, the donor individual's heirs or assignees may have certain rights to the heart-based animal data collected in the recipient individual. This would mean that the donor individual is donating the organ but not necessarily the heart-based animal data or the value derived from the data. The animal data compliance system may be operable to assign one or more rules to any heart-based data collected by the recipient individual to ensure the use of the data complies with the one or more terms established by the donor individual, as well as provide consideration to the donor individual, recipient individual, or a combination thereof, based upon one or more transactions for the heart-based animal data. Characteristically, the animal data compliance system may treat the one or more organs as unique objects and create one or more separate identifiers (e.g., unique identifiers) for each organ in the animal data compliance system. Such unique identifiers would enable terms/rules to be created for each organ based on each unique identifier and would also enable animal data-based transactions to occur for each organ independently of each other and independently of the user. The one or more unique identifiers for the one or more organs or other embodiments may be included as part of the digital record for the user, who also has a unique identifier, to ensure relevant association and chain of ownership, the digital record of the donor individual, the digital record of the recipient individual, or a combination thereof. In a refinement, each of the one or more organs or other embodiments, or a grouping of the one or more organs or other embodiments, may have their own digital record.

Figure 5:
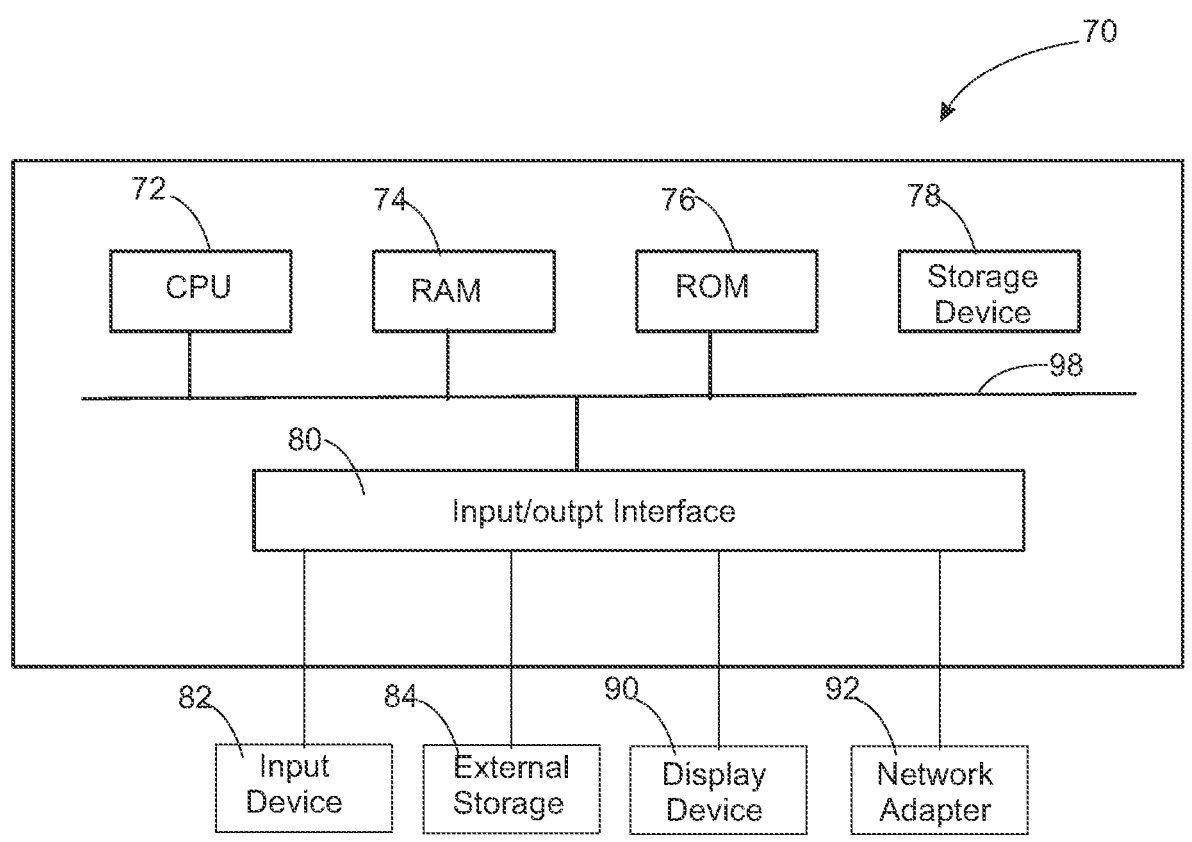
FIG. 5 provides a block diagram of a computing system that can be used to implement the animal data compliance methods.

FIG. 5 provides a block diagram of a computing system or computing device that can be used to implement the animal data compliance methods. In particular, each of the computing devices set forth above can be of the design depicted in FIG. 5. Computing device 70 includes a processing unit 72 that executes the computer-readable instructions for the animal data compliance methods. Processing unit 72 can include one or more central processing units (CPU) or microprocessing units (MPU). Computer device 70 also includes RAM 74 or ROM 76 that can have instructions encoded thereon for animal data compliance methods. In some variations, computing device 78 is configured to display a user interface on display device 28.

Still referring to FIG. 5, computer device 70 can also include a secondary storage device 78, such as a hard drive. Input/output interface 80 allows interaction of computing device 70 with an input device 82 such as a keyboard and mouse, external storage 84 (e.g., DVDs and CDROMs), and a display device 90 (e.g., a monitor). Network adapter 92 is used to connect to other computing devices via a network, a cloud, the Internet, and the like. Computer processing unit 72, the RAM 74, the ROM 76, the secondary storage device 78, and input/output interface 80 are in electrical communication with (e.g., connected to) bus 98. During operation, computer device 70 reads computer-executable instructions (e.g., one or more programs) recorded on a non-transitory computer-readable storage medium which can be secondary storage device 78 and or external storage 84. Computer processing unit 72 executes these reads computer-executable instructions for the animal data compliance methods. Specific examples of non-transitory computer-readable storage medium for which executable instructions for the animal data compliance methods are encoded onto include but are not limited to, a hard disk, RAM, ROM, an optical disk (e.g., compact disc, DVD), or Blu-ray Disc (BD)™), a flash memory device, a memory card, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An animal data compliance system comprising: one or more sources of animal data from one or more targeted individuals participating in an athletic event, wherein the animal data is transmitted electronically; and a collecting computing device that gathers the animal data, the collecting computing device configured to provide animal data to a sports wagering system and/or a sports and an entertainment media system and/or a performance analytics system, the sports wagering system and/or the sports and the entertainment media system, and/or the performance analytics system configured to provide a third party with the animal data or its one or more derivatives wherein for the sports wagering system, the third party includes a sports bettor, wherein:

one or more rules related to at least a portion of the animal data that govern acquisition, distribution, and use of animal data are created or modified based upon one or more terms, (1) the one or more terms being selected, established, created, modified, accepted, and/or agreed upon via a display device by the targeted individual from whom the animal data is derived from or an authorized representative of the targeted individual, and (2) the one or more terms reflecting, at least in part, one or more preferences selected by the individual or the authorized representative via the display device for establishing one or more permissions, restrictions, rights, and/or conditions related to the acquisition, distribution and/or use of at least a portion of the animal data by one or more acquirers and/or receiving computing devices, the one or more preferences including terms related to what animal data can be accessed and at least one of:

the volume of the animal data being accessed frequency of use, allowed use(s) of the animal data, duration and/or term of allowed use(s) of the animal data, transferability of access or rights to the animal data, geographic or contextual areas in which the animal data may be used, consideration required or provided to access the animal data, location and the manner in which the animal data is used, under what conditions the animal data is permitted to be used, who is permitted to access the animal data, what systems or devices may access the animal data, where the animal data may be accessed, where the animal data may be distributed, exclusivity related to access and/or use of the animal data, activity and/or event associated with what animal data can be accessed;

source(s) of the animal data, rights regarding creation or control of derivative works from animal data, ownership rights related to the animal data, anonymity, pseudonymity, and/or identifiability of the animal data, or other data to be associated with the animal data;

the collecting computing device or the receiving computing device further comprising a non-transitory computer-readable storage medium storing computer program instructions which, when executed by a processor, cause the processor to utilize one or more artificial intelligence techniques to infer or deduce one or more preferences of the targeted individual based upon at least one of: (a) one or more characteristics of the targeted individual, (b) one or more previously established preferences of the targeted individual, (c) previous inputs from the display device related to previous animal data transactions of the targeted individual, (d) system-gathered information related to the targeted individual, or (e) observed behavioral patterns of the targeted individual;

wherein the processor is configured to utilize the one or more artificial intelligence techniques to infer or deduce one or more preferences of the targeted individual based upon one or more preferences of one or more other users, wherein the one or more artificial intelligence techniques learn preferences of the one or more other users and observe characteristics of the one or more other users, and wherein, based upon one or more shared characteristics or preferences between the one or more other users and the targeted individual, the one or more artificial intelligence techniques infer or deduce the one or more preferences of the targeted individual;

wherein the processor is further configured to automatically create or modify the one or more rules for the targeted individual based upon the inferred or deduced preferences derived from the targeted individual, the inferred or deduced preferences derived from the one or more other users, or a combination thereof, wherein the one or more artificial intelligence techniques include machine learning techniques that iteratively improve model prediction and accuracy as new data or preferences enter the animal data compliance system;

the animal data compliance system being configured to provide the targeted individual or the authorized representative with an ability to consent, modify, or decline via the display device the one or more automatically created or modified rules prior to implementation, wherein consent is explicit or inferred based upon user preferences established with other animal data or from trends derived from the other data;

the one or more rules are associated with the animal data;

the at least a portion of animal data and the one or more rules are provided to one or more receiving computing devices;

the one or more rules inform the one or more receiving computing devices of one or more permissions, restrictions, rights, and/or conditions related to the animal data; and the one or more receiving computing devices take at least one action based upon the one or more rules; and the one or more receiving computing devices including the sports wagering system and/or the sports and the entertainment media system and/or the performance analytics system.

2. The animal data compliance system of claim 1 wherein the at least a subset of the one or more rules are attached to the animal data as metadata.

3. The animal data compliance system of claim 1 wherein the animal data is human data.

4. The animal data compliance system of claim 1 wherein the one or more sources of animal data includes one or more sensors.

5. The animal data compliance system of claim 4 wherein the one or more sensors is a biosensor that gathers physiological, biometric, chemical, biomechanical, location, environmental, genetic, genomic, glycomic, or other biological data from one or more targeted individuals.

6. The animal data compliance system of claim 5 wherein the one or more sensors gathers, or provides information that can be converted into, at least one of the following types of data: facial recognition data, eye tracking data, blood flow data, blood volume data, blood pressure data, biological fluid data, body composition data, biochemical data, pulse data, oxygenation data, core body temperature data, skin temperature data, galvanic skin response data, perspiration data, location data, positional data, audio data, biomechanical data, hydration data, heart-based data, neurological data, genetic data, genomic data, skeletal data, muscle data, respiratory data, kinesthetic data, ambient temperature data, humidity data, barometric pressure data, or elevation data.

7. The animal data compliance system in claim 4 wherein the one or more sensors are affixed to, are in contact with, or send one or more electronic communications in relation to or derived from, one or more targeted subjects including a targeted subjects' body, eyeball, vital organ, muscle, hair, veins, biological fluid, blood vessels, tissue, or skeletal system, embedded in the one or more targeted individuals, lodged or implanted in one or more targeted individuals, ingested by the one or more targeted individuals, integrated to include at least a subset of the one or more targeted individuals, or integrated into or as part of, affixed to, or embedded within, a fabric, textile, cloth, material, fixture, object, or apparatus that contacts or is in communication with one or more targeted individuals, either directly or via one or more intermediaries.

8. The animal data compliance system of claim 1 wherein the one or more rules are related to providing the animal data for consideration.

9. The animal data compliance system of claim 1 wherein a plurality of rules are associated with the same animal data.

10. The animal data compliance system of claim 1 wherein a single rule of the one or more rules includes a plurality of rules.

11. The animal data compliance system of claim 1 wherein one or more alerts are created or modified based upon the one or more rules.

12. The animal data compliance system of claim 1 wherein the one or more rules or one or more instructions are created or modified based upon one or more instructions either directly or indirectly provided by a user.

13. The animal data compliance system of claim 12 wherein one or more artificial intelligence techniques are utilized to create or modify the one or more rules or the one or more instructions.

14. The animal data compliance system of claim 1 wherein the one or more rules are automatically implemented on the one or more receiving computing devices.

15. The animal data compliance system of claim 1 wherein the one or more rules instruct, alert, enable, or prevent one or more actions related to the animal data on the one or more receiving computing devices.

16. The animal data compliance system of claim 15 wherein the one or more actions are created, modified, or taken utilizing one or more artificial intelligence techniques.

17. The animal data compliance system of claim 1 wherein at least a portion of the animal data and the one or more rules are obfuscated and sent over one or more networks to one or more computing devices.

18. The animal data compliance system of claim 1 wherein at least a portion of the one or more rules are automatically created or modified based on one or more user preferences or characteristics.

19. The animal data compliance system of claim 1 wherein the one or more rules are created or modified on one or more different computing devices from which the animal data is provided.

20. The animal data compliance system of claim 1 wherein a generating computing device generating the one or more rules, providing at least a portion of the animal data, or a combination thereof requires compliance related to the one or more rules from the one or more receiving computing devices.

21. The animal data compliance system of claim 20 wherein the generating computing device provides one or more certifications to the one or more receiving computing devices based upon its compliance.

22. The animal data compliance system of claim 21 wherein the one or more receiving computing devices implement one or more lines of executable code upon receiving the one or more certifications that notify, instruct, enable, or prevent one or more actions related to use of the animal data.

23. The animal data compliance system of claim 1 wherein the animal data compliance system operates utilizing distributed ledger technology or other ledger system.

24. The animal data compliance system of claim 1 wherein one or more lines of executable code are embedded within at least a portion of the animal data.

25. The animal data compliance system of claim 24 wherein the one or more lines of executable code instruct one or more receiving computing devices to take one or more actions.

26. The animal data compliance system of claim 25 wherein the one or more actions include gathering information from the receiving computing device on which the animal data is located and communicating at least a portion of the gathered information to another one or more other computing devices.

27. The animal data compliance system of claim 26 wherein the gathered information includes at least one of: timestamp, IP address, location, device, type of browser, operating system, or service provider.

28. The animal data compliance system of claim 27 wherein one or more notifications are created or modified based upon the gathered information.

29. The animal data compliance system of claim 26 wherein the gathered information enables one or more computing devices to monitor, communicate, enforce, or a combination thereof one or more terms related to consideration.

30. The animal data compliance system of claim 25 wherein the one or more actions are created, modified, or taken automatically utilizing one or more artificial intelligence techniques.

31. The animal data compliance system of claim 1 wherein one or more agreements are automatically generated based upon the one or more rules.

32. The animal data compliance system of claim 31 wherein the one or more agreements include one or more terms related to the animal data from one or more previous agreements.

33. The animal data compliance system of claim 32 wherein the one or more terms are automatically generated and included as part of the one or more agreements.

34. The animal data compliance system of claim 32 wherein a user is prevented by the animal data compliance system from taking one or more actions based upon one or more previous agreements.

35. The animal data compliance system of claim 31 wherein the one or more agreements are created or modified based upon one or more new agreements gathered or created by the animal data compliance system.

36. The animal data compliance system of claim 1 wherein a digital record for the animal data is created or modified, the digital record including the one or more rules associated with the animal data.

37. The animal data compliance system of claim 36 wherein the digital record includes a chain of ownership that is created or modified based upon one or more ownerships or one or more periods of ownership.

38. The animal data compliance system of claim 37 wherein two or more animal data acquirers with rights to the same animal data are combined into the same digital record.

39. The animal data compliance system of claim 37 wherein the chain of ownership that includes multiple owners of the same animal data originates, and is operable to be tracked, from a single user, a single animal data set, or a single type of animal data.

40. The animal data compliance system of claim 1 wherein the at least a portion of the one or more rules are embedded within the animal data.

41. The animal data compliance system of claim 1, wherein the receiving computing device enables one or more users to take one or more actions to create, modify, select, and/or establish the one or more terms related to the animal data.

42. The animal data compliance system of claim 1, wherein based upon one or more agreements, the animal data compliance system restricts and/or defines one or more selections of one or more terms.

43. The animal data compliance system of claim 1, wherein based upon one or more rights granted to one or more data acquirers, the animal data compliance system restricts and/or defines one or more selections of one or more terms.

44. The animal data compliance system of claim 1, wherein one or more artificial intelligence techniques are utilized to learn about one or more user preferences in order to make one or more selections of one or more terms.

45. The animal data compliance system of claim 1, wherein the collecting computing device utilizes one or more machine learning techniques to find patterns in a user's actions and automatically creates one or more rules derived from the user's actions.

* * * * *